(12) United States Patent
Kaufmann et al.

(10) Patent No.: US 11,273,402 B2
(45) Date of Patent: Mar. 15, 2022

(54) FILTER ELEMENT, ELEMENT FRAME OF A FILTER ELEMENT, FILTER BELLOWS OF A FILTER ELEMENT, FILTER HOUSING, AND FILTER

(71) Applicant: MANN+HUMMEL GmbH, Ludwigsburg (DE)

(72) Inventors: Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 142 days.

(21) Appl. No.: 16/052,956

(22) Filed: Aug. 2, 2018

(65) Prior Publication Data
US 2018/0339254 A1    Nov. 29, 2018

Related U.S. Application Data

(63) Continuation of application No. PCT/EP2016/073828, filed on Oct. 6, 2016.

(30) Foreign Application Priority Data

Feb. 3, 2016   (DE) .......................... 102016001132.7

(51) Int. Cl.
*F02M 35/00*     (2006.01)
*B01D 46/00*     (2022.01)
(Continued)

(52) U.S. Cl.
CPC ..... *B01D 46/0005* (2013.01); *B01D 46/0023* (2013.01); *B01D 46/10* (2013.01);
(Continued)

(58) Field of Classification Search
CPC .......................... B01D 46/00; B01D 46/0005; B01D 46/0023; B01D 46/10; B01D 46/4227;
(Continued)

(56) References Cited

U.S. PATENT DOCUMENTS

2004/0020177 A1* 2/2004 Ota ........................ B01D 46/10
                                                          55/481
2008/0110146 A1   5/2008 Germain et al.
(Continued)

FOREIGN PATENT DOCUMENTS

JP      2011153613 A    8/2011

*Primary Examiner* — T. Bennett McKenzie

(57) ABSTRACT

A fluid filter has a filter housing with inlet opening for fluid to be cleaned and outlet opening for cleaned fluid. A filter element arranged in an element receptacle of the filter housing separates inlet opening from outlet opening. The filter housing has a housing body with an installation opening to the element receptacle, through which the filter element in an installation direction is introduced into the element receptacle. The filter housing has a housing cover for closing the installation opening. The installation opening is arranged in a transverse side of the housing body that is lateral relative to the housing axis. The filter housing has a sealing surface, surrounding the housing axis at least partially circumferentially, for contacting a seal of the filter element. The filter element has a seal support device for the seal and the filter housing has a pressing device for the seal support device.

11 Claims, 10 Drawing Sheets

(51) Int. Cl.
  *B01D 46/10* (2006.01)
  *B01D 46/42* (2006.01)
  *B01D 50/00* (2022.01)
  *B01D 46/52* (2006.01)
  *F02M 35/02* (2006.01)
  *F02M 35/024* (2006.01)

(52) U.S. Cl.
  CPC ....... *B01D 46/4227* (2013.01); *B01D 46/521* (2013.01); *B01D 50/002* (2013.01); *F02M 35/0201* (2013.01); *F02M 35/0216* (2013.01); *F02M 35/0245* (2013.01); *F02M 35/02491* (2013.01); *B01D 2265/028* (2013.01); *B01D 2271/022* (2013.01); *B01D 2275/206* (2013.01)

(58) Field of Classification Search
  CPC ................ B01D 46/521; B01D 50/002; B01D 2265/028; B01D 2271/022; B01D 2275/206; F02M 35/0201; F02M 35/0216; F02M 35/0245; F02M 35/0249
  USPC ..................... 55/385.1–385.8, 480, 490–519
  See application file for complete search history.

(56) References Cited

U.S. PATENT DOCUMENTS

| | | |
|---|---|---|
| 2008/0216455 A1 | 9/2008 | Boshoku |
| 2010/0300298 A1 | 12/2010 | Holzmann et al. |
| 2011/0099960 A1 | 5/2011 | Messsen et al. |
| 2013/0074462 A1 | 3/2013 | Muenkel et al. |
| 2016/0230716 A1* | 8/2016 | Finn ................... F02M 35/0201 |

\* cited by examiner

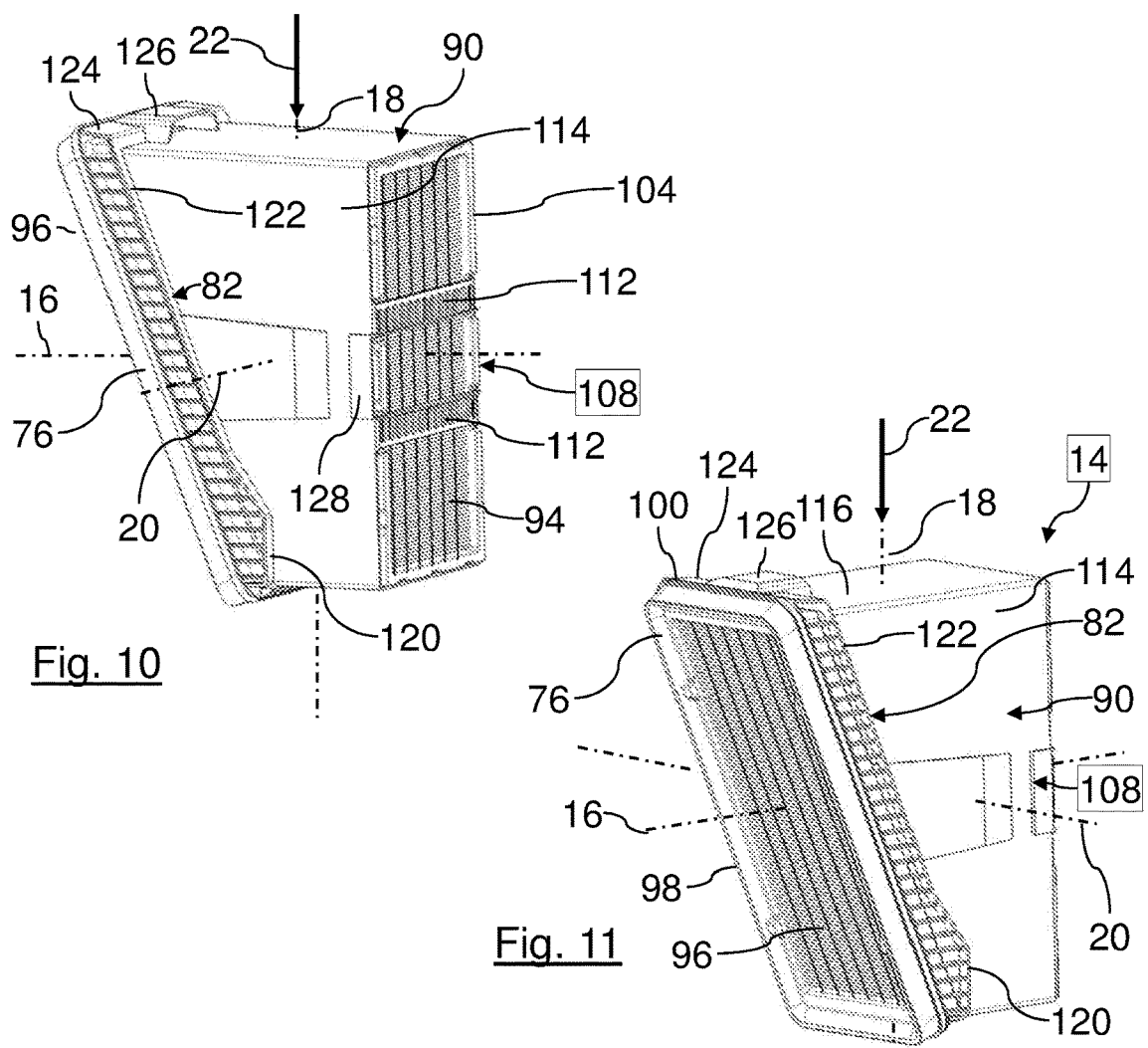
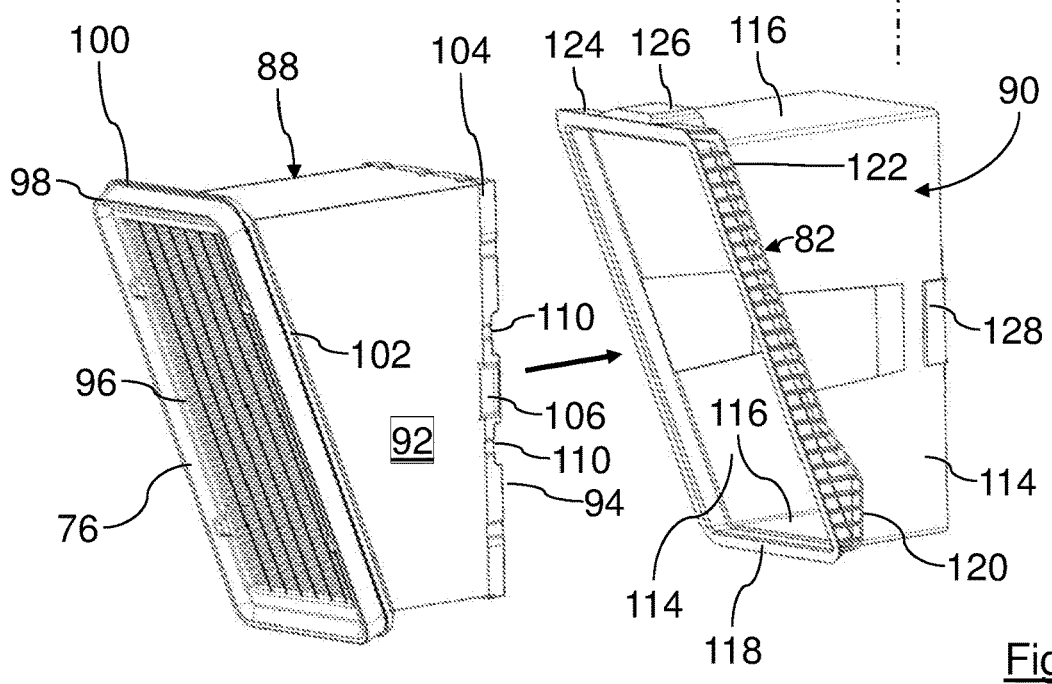

FILTER ELEMENT, ELEMENT FRAME OF A FILTER ELEMENT, FILTER BELLOWS OF A FILTER ELEMENT, FILTER HOUSING, AND FILTER

CROSS-REFERENCE TO RELATED APPLICATIONS

This application is a continuation application of international application No. PCT/EP2016/073828 having an international filing date of 6 Oct. 2016 and designating the United States, the international application claiming a priority date of 3 Feb. 2016 based on prior filed German patent application No. 10 2016 001 132.7, the entire contents of the aforesaid international application and the aforesaid German patent application being incorporated herein by reference.

BACKGROUND OF THE INVENTION

The section discusses background and aspects of the present invention, which are not prior art. Prior art, where presented below, is easily identified to the reader by a patent application number or patent number presented therewith.

The invention concerns a filter element of a filter for in particular gaseous fluid, in particular air, in particular of an internal combustion engine, in particular of a motor vehicle and/or of a machine, which can be installed in a filter housing of the filter in an installation direction which extends parallel or coaxial to an installation axis, with at least one filter bellows comprising at least one filter medium, wherein the at least one filter bellows comprises a respective flow side for fluid at axially oppositely positioned sides relative to an element axis which extends perpendicular or transverse to the installation axis, and with at least one seal which is arranged, relative to the element axis, circumferentially at least partially continuously at least in sections at a radial outer circumferential side of the filter element relative to the element axis.

Furthermore, the invention concerns an element frame of a filter element or for a filter element of a filter for in particular gaseous fluid, in particular air, in particular of an internal combustion engine, in particular of a motor vehicle and/or of a machine, wherein the element frame surrounds or can surround at least one filter bellows of at least one filter medium at least partially circumferentially relative to an element axis, wherein the element axis extends perpendicular or transverse to an installation axis of the filter element into a filter housing.

In addition, the invention concerns a filter bellows of a filter element of a filter for in particular gaseous fluid, in particular air, in particular of an internal combustion engine, in particular of a motor vehicle and/or of a machine, wherein the filter bellows comprises at least one filter medium which, relative to an element axis which extends perpendicularly or transversely to an installation axis of the filter element into a filter housing, comprises a respective flow side for fluid at axially oppositely positioned sides, and, at a radial outer circumferential side of the filter bellows relative to the element axis, at least one seal is arranged which, relative to the element axis, extends circumferentially at least partially continuously.

Moreover, the invention concerns a filter housing of a filter for in particular gaseous fluid, in particular air, in particular of an internal combustion engine, in particular of a motor vehicle, with at least one inlet opening for fluid to be cleaned and at least one outlet opening for cleaned fluid, wherein at least one filter element is arranged or can be arranged in an element receptacle of the filter housing such that it separates the at least one inlet opening from the at least one outlet opening, wherein the filter housing comprises a housing body with at least one installation opening relative to the element receptacle, through which the at least one filter element in an installation direction, which extends parallel or coaxially to an installation axis, can be introduced into the element receptacle of the housing body, and the filter housing comprises at least one housing cover with which the openable installation opening can be closed off, wherein the at least one installation opening is arranged in a transverse side of the housing body that is lateral relative to the housing axis, and the filter housing comprises at least one sealing surface for contact of at least one seal of the at least one filter element which surrounds the housing axis at least partially circumferentially.

In addition, the invention concerns a filter for in particular gaseous fluid, in particular air, in particular of an internal combustion engine, in particular of a motor vehicle, with at least one filter housing in which at least one filter element is arranged, the at least one filter housing comprises at least one inlet opening for fluid to be cleaned and at least one outlet opening for cleaned fluid, wherein at least one filter element is arranged or can be arranged in an element receptacle of the at least one filter housing such that it separates the at least one inlet opening from the at least one outlet opening, wherein the filter housing comprises a housing body with at least one installation opening relative to the element receptacle, through which the at least one filter element in an installation direction, which extends parallel or coaxial to an installation axis, can be introduced into an element receptacle of the housing body, and the at least one filter housing comprises at least one housing cover, with which the openable installation opening can be closed off, wherein the at least one installation opening is arranged in a transverse side of the housing body that is lateral relative to a housing axis, and the at least one filter housing comprises at least one sealing surface for contact of at least one seal of the at least one filter element which surrounds the housing axis at least partially circumferentially.

DE 10 2009 060 517 A1 discloses a filter device, in particular for filtration of intake air of an internal combustion engine. The filter device comprises a pre-separator which is embodied in particular as a cyclone pre-separator, moreover a main filter element which is exchangeably arranged in a housing compartment of the filter housing, as well as a secondary filter element which is arranged downstream thereof in flow direction of the fluid to be cleaned. The housing compartment comprises insertion stays for facilitating preassembly of the main filter element therein. The main filter element is in particular embodied as a double bellows filter, comprising a first radially inwardly positioned filter bellows and a second radially outwardly positioned filter bellows surrounding it. When closing a servicing cover that closes off the housing compartment, the sealing force which is acting on the main filter element is generated and maintained in the closed state of the servicing cover.

SUMMARY OF THE INVENTION

The invention has the object to configure a filter element, a filter element frame of a filter element, a filter bellows of a filter element, a filter housing, and a filter of the aforementioned kind in which an installation of the filter element into the filter housing and/or demounting of the filter element from the filter housing can be improved, in particular simplified. Moreover, a sealing action of a sealing device between the filter element in the filter housing is to be improved.

This object is solved for the filter element in accordance with the invention in that the filter element at least at one exterior side comprises at least one seal support device. The at least one seal support device can contact force-transmittingly the at least one seal at a seal rear side, which is axially facing away from an axial seal surface of the at least one seal relative to the element axis, by means of an element-associated support surface which is facing the at least one seal. At the at least one seal support device, at least one corresponding pressing device of the filter housing can engage the side which is facing away from the at least one seal. A pressing force which is introduced by the pressing device into the at least one seal support device can be transmitted by means of the at least one seal support device to the at least one seal. The at least one seal can thus be pressed by a correspondingly increased sealing force against a corresponding housing-associated sealing surface. In this way, a sealing action can be improved. Due to the interaction of the at least one seal support device with at least one corresponding pressing device of the housing, in particular of a housing body and/or of a housing cover, by means of the shape and/or orientation of corresponding support surfaces, sealing surfaces, and pressing surfaces relative to each other, installation forces acting relative to an installation axis and/or relative to a main axis during installation and/or closing forces acting during closing of the housing cover and/or holding forces acting during holding of the filter element in the filter housing can be deflected such that they achieve among each other improved actions and/or such that an improved sealing action of the at least one seal can be achieved. In this way, in particular a sealing action can be improved and/or forces required for installation of the filter element and/or closing of the housing cover can be reduced by improvement of the leverage.

The element axis penetrates the corresponding flow surfaces of the filter element at the axially oppositely positioned flow sides. The fluid flows through the flow surfaces. The element axis coarsely defines the main flow direction of the fluid through the filter element wherein the actual flow profile of the fluid must not necessarily be homogenous. The main flow direction can also be referred to as the average flow direction. In the mounted state of the filter, the element axis of the filter element can coincide with a housing axis of the filter housing. The element axis and the housing axis can also be referred to as main axis. Advantageously, the installation axis can extend perpendicular or at a slant to the main axis, in particular to the element axis and/or to the housing axis. In this way, the filter element can be installed from the side into the filter housing.

In an advantageous embodiment, at least one element-associated support surface facing the at least one seal and at least one element-associated support surface facing away from the at least one seal of at least one seal support device can be positioned at a slant to each other at least in sections. In this way, the directional components of the acting forces can be adjusted correspondingly to the orientations of the at least one seal and/or of the at least one housing-associated sealing surface relative to the element axis or housing axis.

Advantageously, at least one seal-facing element-associated support surface and at least one element-associated support surface facing away from the seal, viewed in a direction perpendicular to the element axis and perpendicular to the installation axis, can extend at a slant relative to each other at least in sections.

Advantageously, at least one section of at least one seal-facing element-associated support surface and at least one section of at least one element-associated support surface facing away from the seal can be positioned relative to each other at a slant at an angle of between approximately 10° and approximately 30°, in particular approximately 20°. In this way, a ratio of the force to be applied upon installation of the filter element in the filter housing and of a pressing force that is acting in this context by means of the at least one housing-associated pressing device through the at least one seal support device on the at least one seal can be improved. Advantageously, at least one section of at least one seal-facing element-associated support surface can be positioned at a slant at an angle of between approximately 60° and approximately 80°, in particular approximately 70°, relative to the element axis, in particular relative to the main axis and/or housing axis. Advantageously, at least one section of at least one element-associated support surface facing away from the seal can be positioned at a slant at an angle of between approximately 80° and approximately 100°, in particular approximately 90°, to the element axis, in particular to the main axis and/or housing axis.

Advantageously, at least one part of at least one seal-facing element-associated support surface and at least one part of at least one element-associated support surface, facing away from the seal, of the at least one seal support device, viewed in the direction perpendicular to the element axis and perpendicular to the installation axis, can form a wedge-type arrangement wherein a tip of the wedge-type arrangement points approximately in the installation direction. By a corresponding clamping action when introducing the filter element in installation direction into the filter housing, a pressing force of the at least one seal against a housing-associated seal surface can be increased by the wedge-type support.

In a further advantageous embodiment, at least one element-associated support surface facing away from the seal can extend at least in sections parallel or at a slant relative to at least one flow surface, in particular a flow plane, of the filter bellows and/or parallel or at a slant to the installation axis. In this way, upon installation of the filter element into the filter housing, the at least one element-associated support surface facing away from the seal can be guided correspondingly along a housing-associated pressing surface.

Advantageously, at least one seal support device can be arranged on at least one longitudinal side of the filter element. In this way, upon installation into the filter housing, the seal support device can be guided along at least one corresponding housing-associated pressing device. At least one housing-associated pressing device can be arranged correspondingly inwardly on at least one longitudinal wall of the housing. Here, the sides which are extending axially on opposite sides, relative to a transverse axis of the filter element, between the flow sides and the transverse sides of the filter element, are referred to as longitudinal sides of the filter element. Correspondingly, the sides which extend between the transverse sides, an inlet side, and an outlet side of the housing, are referred to as longitudinal sides of the housing. The sides of the filter element and of the filter housing which are axially oppositely positioned relative to the installation axis are referred to as transverse sides, respectively. One of the transverse sides of the filter housing can comprise at least one installation opening for the at least one filter element. The same holds true for the housing cover. The housing cover can also be referred to as servicing cover. Through the opening of the housing cover, the components contained in the element interior, in particular the at least one filter element, can be installed, demounted, and serviced.

Advantageously, at least one seal-facing element-associated support surface of at least one seal support device can be resting along its entire extension along the at least one longitudinal side of the filter element, in particular areally, against the at least one seal. In this way, a uniform areal support action can be achieved.

Advantageously, at least one element-associated support surface, facing away from the seal, of at least one seal support device can extend only across a portion along at least one longitudinal side of the filter element at a slant to at least one seal-facing element-associated support surface of the at least one seal support device. In this way, a space adjacent to the at least one element-associated support surface facing away from the seal can be used for other components, in particular for insertion of at least one part, in particular of a pressing blade, of the housing cover.

In a further advantageous embodiment, at least one seal support device can comprise an element-associated support surface, arranged forward relative to the installation direction and facing away from the seal, and at least one rearward element-associated support surface facing away from the seal. In this way, the at least one seal can be supported in several regions that are remote from each other. Accordingly, a more uniform sealing function can be achieved. Correspondingly, the at least one seal support device can comprise a forward seal-facing element-associated support surface and at least one rearward seal-facing element-associated support surface.

Advantageously, a forward element-associated support surface facing away from the seal and at least one rearward element-associated support surface facing away from the seal can pass in particular as one piece into each other. Correspondingly, a forward seal-facing element-associated support surface and at least one rearward seal-facing element-associated support surface can pass in particular as one piece into each other.

Advantageously, at least one forward seal-facing element-associated support surface and at least one rearward seal-facing element-associated support surface can extend in a common plane or in different planes.

Advantageously, the forward element-associated support surfaces can be arranged in the region of the transverse side of the at least one filter element that is forward relative to the installation direction and/or the rearward element-associated support surfaces at a rearward transverse side of the at least one filter element. In this way, a support in the region of the corresponding transverse side can be realized.

Advantageously, at least one rearward element-associated support surface facing away from the seal with respect to the at least one forward element-associated support surface facing away from the seal can be displaced in a direction toward at least one seal-facing element-associated support surface. A corresponding part, in particular a pressing blade, of the housing cover can be inserted into the thus gained space.

Advantageously, a slant angle between at least one forward seal-facing element-associated support surface and at least one forward element-associated support surface facing away from the seal and a slant angle between at least one rearward seal-facing element-associated support surface and at least one corresponding at least one rearward element-associated support surface facing away from the seal can be different. In this way, the support surfaces can be supported with differently oriented sections of the filter housing.

Advantageously, at least one rearward element-associated support surface facing away from the seal and at least one corresponding rearward seal-facing element-associated support surface can extend at least in sections parallel to each other.

In a further advantageous embodiment, at least one forward element-associated support surface facing away from the seal and at least one rearward element-associated support surface facing away from the seal can be positioned at a slant relative to each other at an angle of between approximately 10° and approximately 30°, in particular approximately 20°, and/or at least one rearward element-associated support surface facing away from the seal can extend parallel to at least one in particular rearward seal-facing element-associated support surface. In this way, a wedge-shaped support guide and a wedge-shaped space for a corresponding part, in particular a pressing blade, of the housing cover can be realized.

In a further advantageous embodiment, at least one seal support device can be realized on a frame, in particular an element frame or support frame, that is extending relative to the element axis at least partially circumferentially, or can be realized as such a frame.

Advantageously, the frame can be in particular continuously shape-stable. In this way, corresponding pressing forces can be transmitted through the frame to the at least one seal.

In a further advantageous embodiment, at least one seal support device can be connected to be separable or separable with destruction with at least one filter bellows of the filter element. Separable seal support devices have the advantage that they can be reused upon exchange of the filter bellows. Non-separable seal support devices can be produced together with the at least one filter bellows and stably connected.

Advantageously, the filter element can comprise at least one element frame in which at least one filter bellows can be arranged. With the element frame, the filter bellows can be protected. Moreover, forces, in particular for pressing on the seal, can be transmitted with the element frame. In this way, the filter bellows can be secured in the filter housing with minimal load, in particular free of force.

Advantageously, at least a filter bellows can be connected separably or non-separably with at least one element frame. In case of a separable configuration the at least one element frame after an exchange of the at least one filter bellows can be reused. The at least one element frame can be designed as an exchangeable frame. Advantageously, the at least one filter bellows can be inserted axially relative to the element axis into the at least one element frame and correspondingly demounted from it. In case of a non-separable configuration, at least one filter bellows and at least one element frame can be preassembled and exchanged together.

Advantageously, at least one element frame and/or at least one filter bellows can comprise at least one part of at least one fixation device for holding the at least one filter bellows in the at least one element frame. With the at least one fixation device, at least one filter bellows can be held in the at least one element frame in the correct installation position. At least one fixation device can serve to prevent that at least one filter bellows, in particular when beating, falls out of the at least one element frame. The at least one filter bellows can thus be beaten without it having to be removed beforehand from the at least one element frame.

Advantageously, at least one fixation device can be realized as a form-fit and/or friction-fit connection. Such fixation devices can be designed such that they can be released again, as needed. Advantageously, at least one fixation device can be realized as a locking connection which can be produced and connected/released easily.

Advantageously, at least one filter bellows and/or at least one element frame can comprise at least one locking nose and/or at least one locking receptacle of a locking connection.

Advantageously, at least one element frame can comprise at least one grip. By means of the at least one grip, the filter element can be gripped and transported. Advantageously, at least one grip can be integrated into a seal support device or can be connected to such a device. In this way, a manufacturing expenditure or space demand can be reduced.

Advantageously, at least one element frame can cover at least one longitudinal side and/or at least one transverse side of at least one filter bellows at least in sections. In this way, the at least one corresponding side of the at least one filter bellows can be protected areally.

Advantageously, at least one element frame can circumferentially surround, in particular continuously, at least one filter bellows. In this way, the stability of the filter element as a whole can be improved.

Advantageously, at least one element frame can be open on at least one flow side of at least one filter bellows, in particular on axially oppositely positioned sides relative to the element axis. In this way, fluid can flow through the corresponding openings of the element frame. Advantageously, at least one element frame can comprise at least one frame stay on at least one open side. With the at least one frame stay, the open side can be stabilized. Moreover, at least one filter bellows can be supported on the at least one frame stay.

Advantageously, the element frame can comprise approximately the same shape and size as the at least one filter bellows. In this way, the filter element as a whole can be realized more compact and in a space-saving way.

Advantageously, at least one element frame can comprise or be comprised of plastic material. The at least one element frame can be produced easily in accordance with a plastic molding process.

Advantageously, at least one sealing surface of at least one seal, at an end face relative to the element axis, can extend at least in sections at a slant relative to the installation axis and/or to the element axis. In this way, the at least one seal can seal relative a corresponding slanted housing-associated sealing surface. Due to the corresponding installation force in installation direction and the corresponding pressing force of the filter housing parallel to the element axis/housing axis when installing the at least one filter element in the filter housing, a corresponding force component for increasing the sealing force can be realized.

Advantageously, at least one filter bellows can extend, at least in sections, at a slant relative to the element axis on at least one flow side. In this way, a prism-shaped filter bellows can be realized.

At least one seal can be arranged such that it can separate a clean fluid side of the filter element from a raw fluid side. Advantageously, at least one seal can face an outflow side of the filter element, in particular can be arranged at an outflow-associated end face of the filter element. In this way, the at least one seal can seal directly at the clean fluid side of the filter element.

Advantageously, at least one filter bellows, in particular the filter element, viewed in the direction of the element axis, can comprise an angular, in particular a rectangular, cross section. In this way, a space demand in relation to a filter surface area can be improved.

Advantageously, at least one filter bellows, in particular the filter element, viewed in installation direction axially to the installation axis, can taper at least in axial direction relative to the element axis. In this way, the filter with filter housing and filter element can be constructed more compact as a whole.

Advantageously, at least one filter medium can be folded in zigzag shape and/or bent. In this way, the filter surface area can be enlarged in relation to the outer dimensions of the at least one filter bellows.

Advantageously, at least a portion of the fold edges of the folded filter medium can extend at least at one flow side transversely, in particular perpendicularly, to the element axis and transversely, in particular perpendicularly, to the installation axis. In this way, a height in the direction of the element axis of the filter bellows, viewed in the direction of the installation axis, can vary. One can speak of a filter bellows with folded filter medium with fold heights that change, in particular are variable, along the installation direction. In this way, an approximately wedge-shaped or prism-shaped filter element can be realized with the filter bellows.

Advantageously, to the at least one filter bellows, in particular in the region of an end face of a filter bellows, at least one seal can be connected separably with destruction or separably with the at least one filter medium. The at least one seal which is separable with destruction can be stably and/or simply connected with the at least one filter medium. A separable seal can be exchanged.

Advantageously, at least one seal can comprise elastic material or can be comprised of it. In this way, corresponding tolerances can be compensated and a sealing function improved. Advantageously, at least one seal can comprise in particular foamed polyurethane (PUR) or can be comprised of it.

Advantageously, at least one seal can be connected with the at least one filter bellows by means of a material-fused and/or frictional and/or form-fit connection, in particular an adhesive connection, a weld connection, a foamed and/or cast connection, a plug-in connection, a locking connection or the like.

Advantageously, at least one reinforcement, in particular a reinforcement frame, in particular of plastic material, can be arranged, in particular embedded, at/in the at least one seal, in particular sealing bead. In this way, the at least one seal can be additionally supported.

The at least one reinforcement can comprise advantageously plastic material or can be comprised of it. In this way, the at least one reinforcement can be produced in a simple way. Moreover, the at least one reinforcement can be provided with a certain elasticity.

Advantageously, the at least one reinforcement can be located in the region of the rear side of the at least one seal which, relative to the sealing surface of the at least one seal, is facing away axially relative to the element axis. In this way, at least one element-associated support surface of at least one seal support device can engage thereat in a force transmitting manner.

Advantageously, at least one sealing surface of at least one seal can extend along a sealing plane. In this way, a planar, flat sealing action can be realized.

Advantageously, the filter element, in particular at least one seal support device and/or optionally at least one element frame, can comprise on its side, rearwardly positioned axially to the installation axis relative to the installation direction, at least one pressing location that is oriented with at least one directional component axially relative to the installation direction. At least one pressing section of at least one housing cover can engage the at least one pressing location. In this way, the filter element, in particular the at least one seal support device, can be forced into the filter housing axially relative to the installation axis. In this way, at least one seal support device between at least one housing-associated sealing surface and at least one pressing location can be tensioned or clamped. A sealing action of the at least one seal can thus be further improved.

Advantageously, the filter element, in particular at least one filter bellows, can comprise at least at one flow side at least one edge protection. With the at least one edge protection, corresponding edges and rims of the filter element, in particular of at least one filter bellows and/or of at least one element frame, can be protected. With the edge protection, the filter element can be protected from damage, in particular when beating. The filter element, in particular the filter bellows, can be beaten with the flow side provided with the edge protection against a hard surface in order to free the at least one filter bellows from particles.

Advantageously, at least one edge protection can project at least past the filter bellows and/or optionally at least past an element frame at least in axial direction relative to the element axis.

Advantageously, the edge protection can be comprised of elastic material, in particular polyurethane, or can comprise such a material. Polyurethane can be connected by foaming or foamed on in a simple way.

Advantageously, the edge protection can extend at least in sections along a circumferential rim of the filter element, in particular of the at least one filter bellows, relative to the element axis. Advantageously, the at least one edge protection can be arranged on at least one filter bellows.

Advantageously, the edge protection can be connected with the at least one filter bellows so that it cannot be separated without destruction. This can be advantageously a material-fused and/or form-fit and/or frictional connection.

Advantageously, at least one edge protection can be foamed, glued, fused or the like at/in/on the at least one filter bellows, in particular filter medium. At least one edge protection can project through openings of at least one possible element frame. In this way, the at least one edge protection can project past the element frame and protect it. At least one filter bellows can thus remain in the element frame during beating and be protected therein. The at least one edge protection can comprise cutouts for corresponding sections, in particular frame stays, of the at least one element frame.

Furthermore, the object is solved in connection with the element frame in that the element frame comprises at least one seal support device. At the at least one seal support device, at least one seal of the filter element can be supported force-transmittingly.

Advantageously, the at least one seal support device can comprise at least one seal-facing element-associated support surface.

Advantageously, the at least one seal-facing element-associated support surface can be located or arranged at a seal rear side of the at least one seal which is facing away axially with respect to the element axis from a sealing surface, axial relative to the element axis, of the at least one seal. In this way, the at least one seal can be supported at its seal rear side.

Advantageously, the element frame may comprise at least one part of a fixation device for interaction with at least one part of the fixation device associated with at least one filter bellows. With the at least one fixation device, at least one filter bellows can be secured in the correct installation position with the aid of the at least one element frame.

Furthermore, the object is solved for the filter bellows according to the invention in that at least one seal support device is arranged on at least one exterior side of the filter bellows and comprises at least one seal-facing element-associated support surface, at which at least one seal with a seal rear side is force-transmittingly supported, wherein the seal rear side is located on a side of the at least one seal which, relative to the element axis, is facing axially away from an axial sealing surface.

Advantageously, the filter bellows can comprise at least one bellows-associated part of at least one fixation device for interaction with at least one frame-associated part of the fixation device associated with the element frame.

Advantageously, at least one bellows-associated part of at least one fixation device can be realized as a projection for interaction with a corresponding receptacle as a frame-associated part of the at least one fixation device, or vice versa. Correspondingly, on the part of the element frame, at least one receptacle and/or at least one projection can be realized. The projections can interact with the receptacles to a locking connection, respectively. The receptacles can be realized as grooves or depressions. The projections can be realized as raised regions.

Advantageously, at least one bellows-associated part and/or at least one frame-associated part of at least one fixation device can be at least partially elastic. In this way, the fixation device can be connected and, as needed, also separated more easily, in particular with a reduced force expenditure. In this respect, the corresponding elastic parts can be elastically deformed.

Advantageously, at least one part of the fixation device can be combined with an edge protection, in particular connected as a one piece therewith or formed from/with it. In this way, a space demand, a manufacturing expenditure, and a material expenditure for realizing the filter bellows can be reduced.

Furthermore, the object is solved for the filter housing according to the invention in that the filter housing comprises at least one pressing device for a seal support device of the at least one filter element. With the at least one pressing device, a pressing force can be applied to the at least one seal support device. By means of the at least one seal support device, at least one seal of the filter element can be pressed against at least one sealing surface of the filter housing. A sealing action can be improved in this way.

In an advantageous embodiment, at least one pressing device can have at least one housing-associated pressing surface which can be arranged on the side of the element receptacle that is axially positioned opposite the at least one sealing surface in relation to the housing axis. In this way, the seal support device and thus the filter element can be supported on the side which is positioned axially opposite the sealing surface relative to the main axis.

In a further advantageous embodiment, at least one housing-associated pressing surface can extend at a slant to the at least one sealing surface. In this way, directional components of the installation forces acting during installation perpendicular to the at least one sealing surface can contribute to an increase of the sealing action. Advantageously, at least one housing-associated pressing surface can extend at a slant relative to the sealing surface of the seal at the same or a similar slant angle as a corresponding support surface, facing away from the seal, of the at least one seal support device of the filter element. In this way, the at least one seal support device can be pressed like a wedge between the at least one housing-associated pressing surface and the at least one seal. In this way, the at least one seal can be pressed with a greater sealing force against the at least one housing-associated sealing surface.

In a further advantageous embodiment, at least one forward housing-associated pressing surface can be located on a side of the housing body which, relative to an installation direction of the filter element into the housing body, is positioned axially opposite the at least one installation opening. In this way, the at least one filter element can be clamped relative to the installation axis at axially oppositely positioned sides. In this way, a more uniform improvement of the sealing action can be achieved.

In a further advantageous embodiment, at least one housing cover can comprise at least one pressing blade with at least one pressing surface. The at least one pressing blade can be inserted, when the filter element is installed, into a lateral region between the exterior side of the filter element and the inner side of the housing body. With the at least one pressing blade, at least one filter element can be clamped in the filter housing by means of the at least one housing cover.

Advantageously, at least one pressing blade can comprise at least one seal-facing cover-associated pressing surface and/or at least one cover-associated pressing surface facing away from the seal. With at least one seal-facing cover-associated pressing surface, the at least one pressing blade can press against a corresponding element-associated support surface of a seal support device facing away from the seal. With at least one cover-associated pressing surface facing away from the seal, the at least one pressing blade can be supported against a corresponding rearward housing-associated pressing surface of the housing body which is facing the installation opening. In case that at least one seal-facing cover-associated pressing surface as well as at least one cover-associated pressing surface facing away from the seal are present, the at least one pressing blade can be clamped between the corresponding element-associated support surface facing away from the seal and the rearward housing-associated pressing surface. In this way, a connection, in particular a pivot connection, between the at least one housing cover and the housing body can be mechanically relieved. As a whole in accordance with the invention, with the assistance of the housing cover with the at least one pressing blade, the at least one filter element can be clamped in the housing and sealed by means of the at least one seal with a reduced force expenditure.

Advantageously, at least one seal-facing cover-associated pressing surface can have a course which is complementary to at least one element-associated support surface, facing away from the seal, of at least one seal support device of at least one filter element. In this way, the at least one seal-facing cover-associated pressing surface can contact areally the at least one element-associated support surface facing away from the seal.

In a further advantageous embodiment, in the closed state of the housing cover, at least one seal-facing cover-associated pressing surface can extend, at least in sections, at a slant to the installation axis and/or parallel, at least in sections, to the housing-associated seal surface. In this way, directional components of closing forces which are applied upon closing, in particular pivoting, of the housing cover can be introduced perpendicular to the housing-associated seal surface. In this way, the sealing action can be improved.

Advantageously, at least one cover-associated pressing surface facing away from the seal can comprise at least one curve or at least one bend. A forward section, in the closing pivot direction of the housing cover in front of the at least one curve, can be guided along a rearward housing-associated pressing surface. With a rearward section behind the at least one curve, the pressing blade can essentially "lock" at the rearward housing-associated pressing surface.

Advantageously, the housing cover can comprises at oppositely positioned longitudinal sides one pressing blade, respectively. In this way, the at least one filter element can be clamped at opposite sides with one pressing blade, respectively.

Advantageously, the filter housing can comprises at least one fall-out protection device which can prevent that the at least one filter element can drop in an uncontrolled fashion out of the element receptacle when the installation opening is open. The at least one fall-out protection device simplifies an exchange of the filter element in case of an overhead arrangement of the filter housing. In the overhead arrangement, the at least one installation opening is spatially oriented downward. The fall-out protection device prevents that the at least one filter element drops down in an uncontrolled fashion when opening the housing cover. When the housing cover is open, the fall-out protection device must be overcome separately for removing the at least one filter element. Since the at least one fall-out protection device is arranged at the filter housing, a special fall-out protection device on the part of the filter element is not needed.

Advantageously, at least one fall-out protection device can comprise at least one projection which decreases an inner width of the installation opening at least in one direction relative to a correspondingly oriented inner width of the adjoining region of the element receptacle. The aforementioned adjoining region of the element receptacle can advantageously be its widest location. Here, the widest region of the at least one filter element can be advantageously arranged. The widest region of the at least one filter element can fill the widest region of the element receptacle as completely as possible. By reducing the inner width of the installation opening, it can be prevented that the at least one filter element with its widest region can slide through the installation opening. The at least one fall-out protection device must be overcome by an appropriate manipulation in order to be able to completely remove the at least one filter element. In particular, overcoming the fall-out protection device can be effected by elastic deformation on the part of the at least one filter element and/or on the part of the filter housing and/or by a suitable displacement of the filter element at a slant or transversely to the installation axis.

Advantageously, at least one fall-out protection device can comprise at least one projection, in particular a stay, a rib, a bead and/or a nipple which projects into the installation opening. Such a fall-out protection device can be realized in a simple way.

Advantageously, at least one part of the fall-out protection device can be arranged in a region of the installation opening which is facing at least one sealing surface and/or at least one part of the fall-out protection device can be arranged in a region of the installation opening which is axially facing away from the at least one sealing surface relative to the housing axis. In case the at least one part of the fall-out protection device is arranged at the at least one sealing surface, it can engage at least one seal of the filter element.

Advantageously, a sealing lip of the at least one seal for overcoming the fall-out protection device can be correspondingly in particular elastically deformed, in particular compressed and/or bent.

Advantageously, an inner width of the installation opening can be smaller than a corresponding maximum expansion of the at least one filter element in its widest region in the direction of the element axis. In this way, an at least part-elastic seal of the filter element can be deformed for overcoming the fall-out protection device so that the corresponding maximum expansion of the filter element can be reduced thereby and is smaller than the inner width of the installation opening.

Advantageously, a reduction of the inner width of the installation opening in comparison relative to the inner width of the adjoining region of the element receptacle can be smaller than a maximum compressibility of the filter element in its corresponding widest region. In this way, the at least one fall-out protection device can be achieved by a corresponding deformation of the filter element. Advantageously, the compressibility is realized or can be realized by the compressibility of at least one seal of the filter element.

Advantageously, when the filter element is installed, the housing axis and the element axis can extend parallel to each other or coincide.

Advantageously, the installation axes of the filter element and of the housing can coincide.

Advantageously, the installation axis and the housing axis or the element axis can extend perpendicular or at a slant relative to each other.

Advantageously, at least one sealing surface can extend, at least in sections, at a slant to the installation axis and/or to the housing axis.

Advantageously, at least one inlet opening and at least one outlet opening can be arranged on axially opposite sides of the housing body relative to the housing axis, in particular to the main axis and/or the element axis. In this way, the filter can be linearly configured. The corresponding stages of the filter, i.e., a pre-separator, at least one filter element according to the invention that is acting as a main filter element, and at least one secondary filter element can be arranged fluidically inline or in series. Such linearly constructed filters can be referred to as "inline filters". For such a linearly constructed filter, the main flow direction of the fluid in the filter can extend substantially parallel to the main axis, in particular to the element axis, and to the housing axis.

Advantageously, at least one installation opening for at least one filter element can be arranged in a transverse side of the housing body. The at least one installation opening can extend between an end face of the housing body with the at least one inlet opening and an end face with the at least one outlet opening. In this way, the at least one installation opening, the at least one inlet opening, and the at least one outlet opening can be realized in different sides of the housing body.

Advantageously, at least one housing cover can be attached pivotably to the housing body with at least one pivot device, in particular a hinge or joint. In this way, the housing cover can be pivoted by means of a pivot movement onto the installation opening. In this way, the at least one pressing blade can be pushed through the installation opening into an intermediate space between a longitudinal side of the at least one filter element and a corresponding longitudinal side of the filter housing.

Advantageously, the at least one pivot device can be separable so that the housing cover can be separated from the housing body. The housing cover can be in particular hooked in a hinge of the housing body. The housing cover may comprise a sleeve section which can be pushed onto a bolt section of the housing body. In this way, a simple hinge can be formed. Advantageously, the sleeve section can be open at a circumferential side. In this way, for joining the pivot connection, the sleeve section can be pushed, relative to the pivot axis of the at least one pivot device, in radial direction onto the bolt section. The sleeve section must not be pushed on in axial direction. In this way, a space that is required for assembly of the at least one pivot connection can be reduced. The housing cover can be pivoted about a pivot axis of the hinge. Upon pivoting, the filter element can be pushed by the housing cover with a directional component in installation direction and/or a directional component axial, parallel or at a slant to the housing axis. The at least one seal in this context can be pressed by means of the housing cover, in particular by at least one pressing blade, against the at least one housing-associated sealing surface. By pushing the filter element by means of the at least one housing cover farther into the element interior, by means of a wedge-shaped arrangement introduced into the filter housing, in particular at least one housing-associated pressing surface, the at least one seal can also be pressed in the forward region of the element interior, viewed in installation direction, against the housing-associated sealing surface.

Advantageously, an actuation section can be arranged at a region of the housing cover which is remote from the pivot attachment of the housing cover at the housing body. At/with the actuation section, the housing cover can be pivoted in particular by hand and/or by means of a tool or a machine. In this way, due to the corresponding lever arm, the clamping forces and pressing forces for clamping the at least one filter element in the filter housing can be applied better.

Advantageously, the at least one housing cover can be secured in its closed position on the housing body by means of a fastening and/or locking device, in particular at least one clamping fastener and/or at least one clasp. In this way, the housing cover can be secured against automatic opening.

Furthermore, the object is solved for the filter according to the invention in that at least one filter element comprises at least one seal support device for at least one seal and the filter housing comprise at least one pressing device for a seal support device of the at least one filter element.

Advantageously, at least one filter element can comprise at least one element frame in which at least one filter bellows is arranged.

Advantageously, the filter housing can comprise at least one fall-out protection device which can prevent that the at least one filter element can fall out in an uncontrolled fashion from the element receptacle when the installation opening is open.

Advantageously, the filter can be designed as a multistage filter, in particular two-stage compact air filter. Advantageously, at least one filter element can be arranged fluidically downstream of at least one particle separation device, in particular a cyclone arrangement. The at least one particle separation device can be part of the filter or arranged upstream external thereto, in particular as a pre-separator. An external pre-separator can be arranged outside of a motor compartment. Advantageously, at least one inlet opening, at least one outlet opening, and optionally a particle separation device can be arranged substantially linearly. In this way, the fluid can flow substantially in particular along the housing axis in accordance with the filter.

One of the flow sides of the filter bellows can realize an inflow side for the fluid, the other flow side can realize an outflow side. The fluid flows through the filter bellows from the inflow side to the outflow side. The flow sides can each be realized as flow surface wherein in case of a folded filter bellows the respective fold edges define the corresponding flow surface.

Advantageously, the filter element can be a so-called flat filter element. In a flat filter element in the meaning of the invention, the filter medium is not closed to a hollow body. The filter element according to the invention is not annular. The flow sides are positioned relative to the element axis axially opposite each other. In contrast thereto, in a hollow filter element, in particular a so-called round filter element, the filter medium is circumferentially closed and surrounds an interior. The filter element according to the invention can be planar or curved. In this context, an inflow side and/or an outflow side of the filter bellows for the fluid can be planar, curved or stepped. The filter element can also be box-shaped.

The filter bellows can approximately have the shape of a polyhedron. Advantageously, the filter bellows can be shaped as a cube, parallelepiped, pyramid, prism, wedge or the like. In this context, it is not required that all sides, in particular circumferential sides, of the filter bellows are planar. At least one side of the filter bellows can at least partially be bent, in particular parabolic, and/or stepped. Opposite sides can extend parallel. Alternatively or additionally, they can also be extending at a slant or non-parallel to each other in another way. Advantageously, the inflow surface and/or the outflow surface each, at least in sections, can extend perpendicular or at a slant to the element axis. Advantageously, the inflow side and the outflow side, at least in sections, can be positioned at a slant to each other and/or, at least in sections, parallel to each other.

Advantageously, at least one filter bellows can comprise a filter medium that is formed in a zigzag shape and/or corrugated shape. In this way, the surface area of the filter medium to be flowed through by the fluid can be enlarged in relation to the spatial expansion of the filter bellows. Advantageously, fold edges of the filter medium can extend parallel to each other at the oppositely positioned flow sides, in particular at an inflow side and/or at an outflow side.

Advantageously, at least one filter bellows can comprise relatively deep folds and/or variable fold heights. The expansion of a fold of the folded filter medium between an inflow-associated fold edge and an adjacent outflow-associated fold edge is referred to as fold height. In case of deep folds, the fold height, i.e., the height of the filter bellows in the region of the corresponding fold, is larger than a width and/or a length of the filter bellows perpendicular or transverse to the fold height.

The filter medium can comprise filter paper, filter nonwoven, meltblown, fabric and/or another type of filter material that is suitable for filtering fluid, in particular air. Advantageously, the filter medium can be flexible, in particular foldable or bendable.

The filter bellows alternatively or additionally can comprise fluid-permeable, in particular air-permeable, filter foam.

The filter bellows can be realized at least partially as a massive block of filter material, in particular filter foam.

The invention can be used in motor vehicles, construction/agricultural machines, compressors, industrial motors or other devices with internal combustion engines.

Vehicles in the meaning of the invention can be land craft, watercraft and/or aircraft.

Advantageously, the motor vehicle can be a passenger car, a truck, a motorcycle, an autobus, a tractor, an agricultural vehicle and/or a construction vehicle or the like.

The invention can advantageously be part of an air intake manifold of an internal combustion engine. The filter can serve for cleaning combustion air to be supplied to the internal combustion engine. The invention is however not limited to an air filter of an air intake manifold of an internal combustion engine of a motor vehicle. Instead, it can also be used for other types of air systems of motor vehicles or other machines, in particular agricultural machines or construction machines. The air filter can also be used outside of the automotive field, in particular in industrial motors.

In other respects, the features and advantages which have been disclosed in connection with the filter element according to the invention, the element frame according to the invention, the filter bellows according to the invention, the filter housing according to the invention, and the filter according to the invention, and their respective advantageous embodiments apply correspondingly among each other, and vice versa. The individual features and advantages can, of course, be combined among each other, wherein further advantageous effects may result which go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims also individually and combine them to other meaningful combinations.

FIG. 10 is an isometric illustration of the filter element of the air filter of FIGS. 1 through 9 looking at a slant onto the inflow side.

FIG. 11 is an isometric illustration of the air filter of FIG. 10 looking at a slant onto the outflow side.

FIG. 12 is an isometric exploded illustration of the air filter of the FIGS. 10 and 11 comprised of a filter bellows and an element frame.

In the Figures, same components are provided with same reference characters.

DESCRIPTION OF PREFERRED EMBODIMENTS

Figure 1:
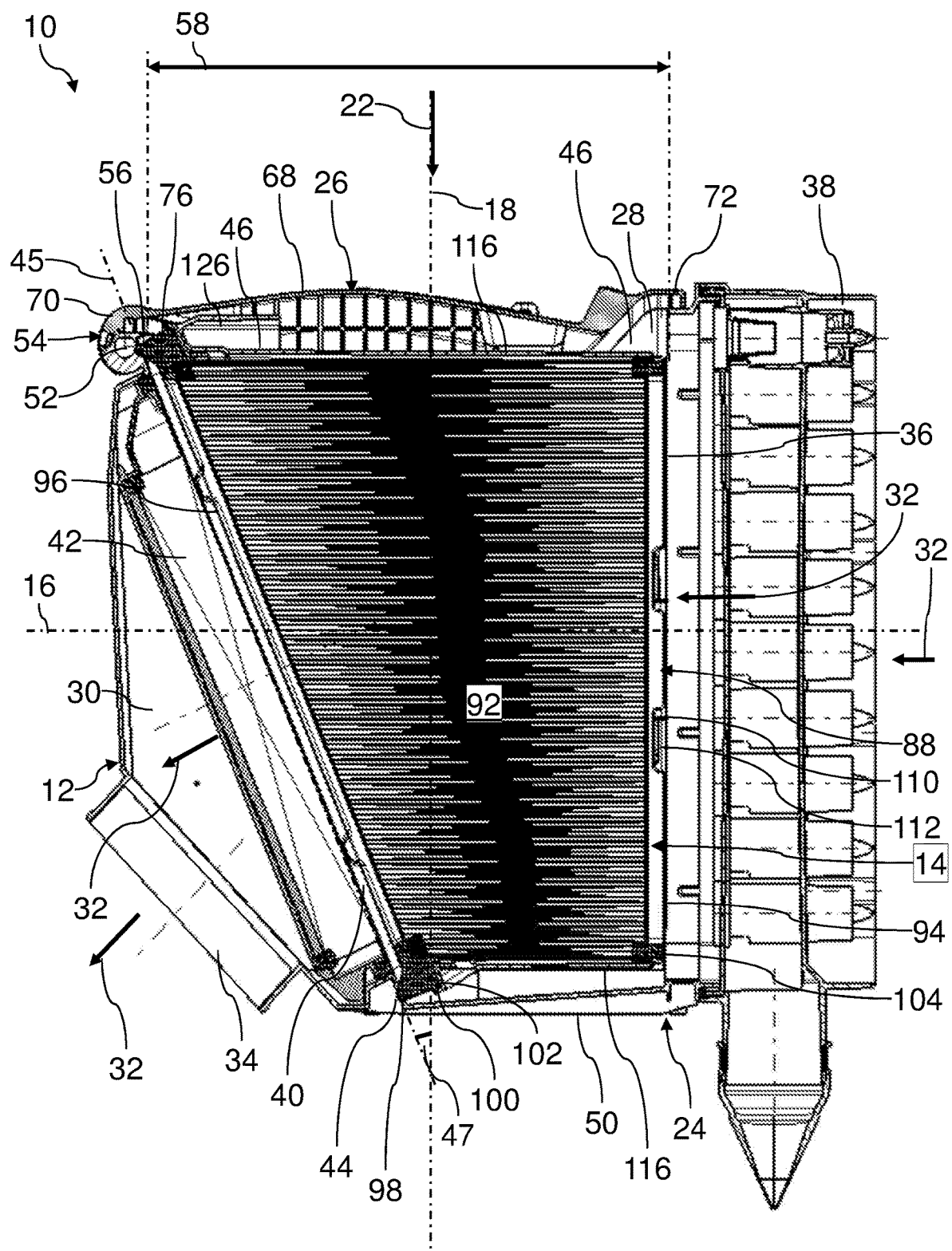
FIG. 1 shows a longitudinal section of an air filter with a filter housing in which exchangeably a filter element according to a first embodiment is arranged.

In the FIGS. 1 through 25 an air filter 10 of an internal combustion engine, not illustrated, is illustrated in different illustrations, sections, detail views, and assembly states. The air filter 10 is arranged in an intake manifold for combustion air of the internal combustion engine. It serves for cleaning the combustion air which is supplied to the internal combustion engine for combustion.

The air filter 10 comprises an openable filter housing 12 in which exchangeably a filter element 14 is arranged.

For simplifying the explanation, in some of the Figs. an imaginary main axis 16, an installation axis 18, and an imaginary transverse axis 20 are illustrated. In the illustrated embodiment, the axes 16, 18, and 20 correspond in an exemplary fashion to the axes of a right angle coordinate system. The main axis 16 defines together with the installation axis 18 a longitudinal center plane, not identified any further, and together with the transverse axis 20 a transverse center plane, also not identified any further. The installation axis 18 defines with the transverse axis 20 a flow center plane, not identified any further. In the FIGS. 1 and 2, the longitudinal center plane extends parallel to the drawing plane. The flow center plane and the transverse center plane extend perpendicular to each other and perpendicular to the longitudinal center plane, in the FIGS. 1 and 2 also perpendicular to the drawing plane. An installation direction of the filter element 14 into the filter housing 12 is illustrated by an arrow 22. In an exemplary fashion, the installation direction 22 extends coaxial to the installation axis 18. It is understood that some of the aforementioned axes and some of the aforementioned planes can also extend at a slant to each other in other embodiments of the invention.

In the mounted state of the air filter 10, the main axis 16 coincides with the element axis of the filter element 14 and the housing axis of the filter housing 12 in the illustrated embodiment. For simplifying the drawing, the reference character 16 is therefore used for the element axis and the housing axis, depending on the illustration. It is understood that the corresponding axis is referred to, respectively, in this context. The same holds true also for the installation axis 18.

The filter housing 12 is manufactured of plastic material. The filter housing 12 comprises a housing body 24 and a housing cover 26.

The housing body 24 comprises an element receptacle 28 for the filter element 24. An air outlet space 30 adjoins the element receptacle 28 downstream relative to the air flow through the air filter 10. The air flow into, through, and out of the air filter 10 is illustrated in the FIGS. 1 to 3 by arrows 32.

An outlet socket 34 to which the air conduit of the intake manifold is connected adjoins the air outlet space 30. At the air inlet side, the receptacle 28 comprises an inlet opening 36. The inlet opening 36 extends across the entire inflow side of the air filter 10. It extends parallel to the flow center plane. Upstream of the inlet opening 36, a cyclone arrangement 38 as pre-separator for particles from the air is arranged.

At its outflow side, the element receptacle 28 has an outlet opening 40. The outlet opening 40 extends in a plane parallel to the transverse axis 20 and at a slant to the flow center plane, i.e., at a slant to the plane of the inlet opening 36.

The element receptacle 28, the outlet opening 40, and the inlet opening 36 each have a rectangular cross section, viewed in the direction of the main axis 16.

In the air outlet space 30, a secondary filter element 42 is arranged which is not of interest here. The secondary filter element 42 covers the outlet opening 40 completely.

The outlet opening 40 is surrounded by a housing-associated sealing surface 44. The housing-associated sealing surface 44 is facing the element receptacle 28. Relative to the main axis 16, it is continuous circumferentially. A sealing plane 45 of the housing-associated sealing surface 44 extends parallel to the transverse axis 20 and at a slant to the flow center plane by an angle 47 of approximately 20°.

The transverse sides of the housing body 24 and of the filter element 14 extend on opposite sides of the transverse center plane in the embodiment. Correspondingly, the longitudinal sides of the housing base body 24 of the filter element 14 are positioned on opposite sides of the longitudinal center plane. The longitudinal sides of the housing body 24 and of the filter element 14 extend each between the corresponding transverse sides and the inflow side and the outflow side.

At the longitudinal sides, the housing body 24 comprises closed longitudinal walls 48. In FIGS. 2, 5 to 9, and 17 to 25, the respective forward longitudinal wall 48 of the housing body 24 is at least partially cut away in order to enable a view of the interior of the filter housing 12.

At a rearward transverse side relative to the installation direction 22, the housing body 24 has an installation opening 46 for the filter element 14. At the transverse side that is positioned axially opposite thereto relative to the installation axis 18, the housing body 24 comprises a closed transverse wall 50.

The installation opening 46, viewed in installation direction 22, has an approximately rectangular cross section. Viewed in the installation direction 22 from the installation opening 46 toward the oppositely positioned transverse wall 50, the element receptacle 28 tapers in its expansion relative to the main axis 16. Viewed in the direction of the transverse axis 20, the element receptacle 28 has approximately the shape of a right angle trapezoid wherein the slanted leg of the trapezoid is facing the outlet opening 40.

At the exterior side of the housing body 24, adjacent to the installation opening 46, a bolt section 52 of a hinge-type pivot connection 54 is arranged. The pivot connection 54 serves for connecting the housing cover 26 with the housing body 24. The bolt section 52 is located at the side of the installation opening 26 which is facing the outflow side of the housing body 24. The bolt section 52 and thus the pivot axis of the pivot connection 54 extend parallel to the transverse axis 20.

A fall-out protection device 56 for the filter element 14 is located adjacent to the bolt section 52. The fall-out protection device 56 is visible in particular in FIG. 18 in detail. The fall-out protection device 56 is realized as a stay which is projecting as a projection into the installation opening 46. The fall-out protection device 56 extends approximately parallel to the transverse center plane across the entire width of the installation opening 46 in the direction of the transverse axis. The fall-out protection device 56 decreases an inner width 58 of the installation opening 46 in the direction of the main axis 16 in comparison to the adjoining region of the element receptacle 28.

Moreover, the housing body 24 has two pressing devices 60. The pressing devices 60 are located relative to the transverse axis 20 at axially oppositely positioned inner sides of the longitudinal walls 48. The pressing devices 60 relative to the longitudinal center plane are mirror-symmetrical so that in the following in an exemplary fashion only one of the two pressing devices 60 will be described.

The pressing device 60 is realized as a projection which protrudes axially inwardly at the corresponding longitudinal wall 48 relative to the transverse axis 20. Viewed in the installation direction 22, the pressing device 60 comprises a forward housing-associated pressing surface 62 and a rearward housing-associated pressing surface 64. The rearward housing-associated pressing surface 64 is located near the installation opening 46. The forward housing-associated pressing surface 62 is arranged near the transverse wall 50.

A housing-associated guiding surface 66 is extending between the forward housing-associated pressing surface 62 and the rearward housing associated pressing surface 64.

The pressing surfaces 62 and 64 as well as the guiding surface 66 are facing the housing-associated sealing surface 44. The housing-associated pressing surfaces 62 and 64 and the housing-associated guiding surface 66 extends respectively with a directional component parallel to the transverse axis 20. The forward housing-associated pressing surface 62 and the rearward housing-associated pressing surface 64 extend each with the directional component that is perpendicular thereto approximately parallel to the flow center plane, i.e., parallel to the installation axis 18. The forward housing-associated pressing surface 62 and the rearward housing-associated pressing surface 64 are each positioned at a slant relative to the sealing plane 45 approximately at the same angle as the angle 47, i.e., about approximately 20°

The rearward housing-associated pressing surface 64 is located, viewed in the direction of the main axis 16, at a larger spacing from the flow center plane and the installation axis 18 than the forward housing-associated pressing surface 62. The housing-associated guiding surface 66 extends correspondingly at a slant to the flow center plane.

The housing cover 26 comprises a closure section 68 which forms the transverse side of the housing cover 26. A rim of the closure section 68 extending circumferentially relative to the installation axis 18 extends complementary to a corresponding rim surrounding the installation opening 46 of the housing body 24. The closure section 68 is resting in the closed position of the housing cover 26 seal-tightly against the installation opening 46 and closes it off.

At the side which is facing the outflow side of the filter housing 12, the housing cover 26 comprises a sleeve section 70 which forms the cover-associated part of the pivot connection 54. The sleeve section 70 extends parallel to the transverse axis 20. The sleeve section 70 is open at a circumferential side which is facing the inlet side of the filter housing 12 so that the sleeve section 70 for connecting the pivot connection 54 can be pushed onto the bolt section 52 in radial direction.

At the side which is facing the inflow side of the filter housing 12 and facing away from the sleeve section 70, the housing cover 26 comprises an actuating section 72. The housing cover 26 can be actuated at the actuating section 72 for closing or opening.

Moreover, the housing cover 26 comprises two pressing blades 74 for pressing a seal 76 of the filter element 14 against the housing-associated sealing surface 44. The pressing blades 74 are identical and arranged mirror-symmetrical to the longitudinal center plane.

In the following, in an exemplary fashion one of the pressing blades 74 will be described. The pressing blade 74 extends substantially parallel to the installation axis 18 and to the main axis 16, i.e., parallel to the longitudinal center plane. The pressing blade 74 passes within the rim of the closure section 68 as one piece into closure section 68. In the installed state, the pressing blade 74 extends through the installation opening 46 into the element receptacle 28. Here, the pressing blade 74 is positioned between the corresponding longitudinal wall 48 of the housing body 24 and the exterior side of the filter element 14, on the one hand, and between the seal 76 of the filter element 14 and the pressing device 60 of the housing body 24, on the other hand.

The pressing blade 74 comprises a seal-facing cover-associated pressing surface 78. The seal-facing cover-associated pressing surface 78 is located at the side of the pressing blade 74 which is facing the sleeve section 70 of the pivot connection 54. The seal-facing cover-associated pressing surface 78 in the closed state of the housing cover 26 is facing the housing-associated sealing surface 44 and the seal 76. It extends then parallel to the transverse axis 20 and at a slant to the installation axis 18 at an angle which corresponds to the angle 47 of approximately 20°. The housing-associated sealing surface 44 and the seal-facing cover-associated pressing surface 78 extend parallel to each other in the closed state of the housing cover 26. The seal-facing cover-associated pressing surface 78 is located in the closed state at a spacing to the housing-associated sealing surface 44 which corresponds to a corresponding expansion of the seal 76 and of a seal support device 82 of the filter element 14 thereat.

On the side which is opposite the seal-facing cover-associated pressing surface 78, the pressing blade 74 comprises a cover-associated pressing surface 80 which is facing away from the seal. The cover-associated pressing surface 80 which is facing away from the seal is facing the inflow side of the filter housing in the closed state of the housing cover 26. A rearward section, facing the closure section 68, of the cover-associated pressing surface 80 facing away from the seal extends then approximately parallel to the installation axis 18 and parallel to the transverse axis 20. This section is then flat against the rearward housing-associated pressing surface 64 of the housing body 24. Behind a bend, the rearward section of the cover-associated pressing surface 80 facing away from the seal passes as one piece into a forward section. The forward section of the cover-associated pressing surface 80 facing away from the seal extends approximately tangentially relative to the pivot axis of the pivot connection 54.

At the closure section 68, two pressing sections 84 which are axially oppositely positioned relative to the transverse axis 20 are arranged between the sleeve section 70 and the pressing blades 74.

Figure 3:
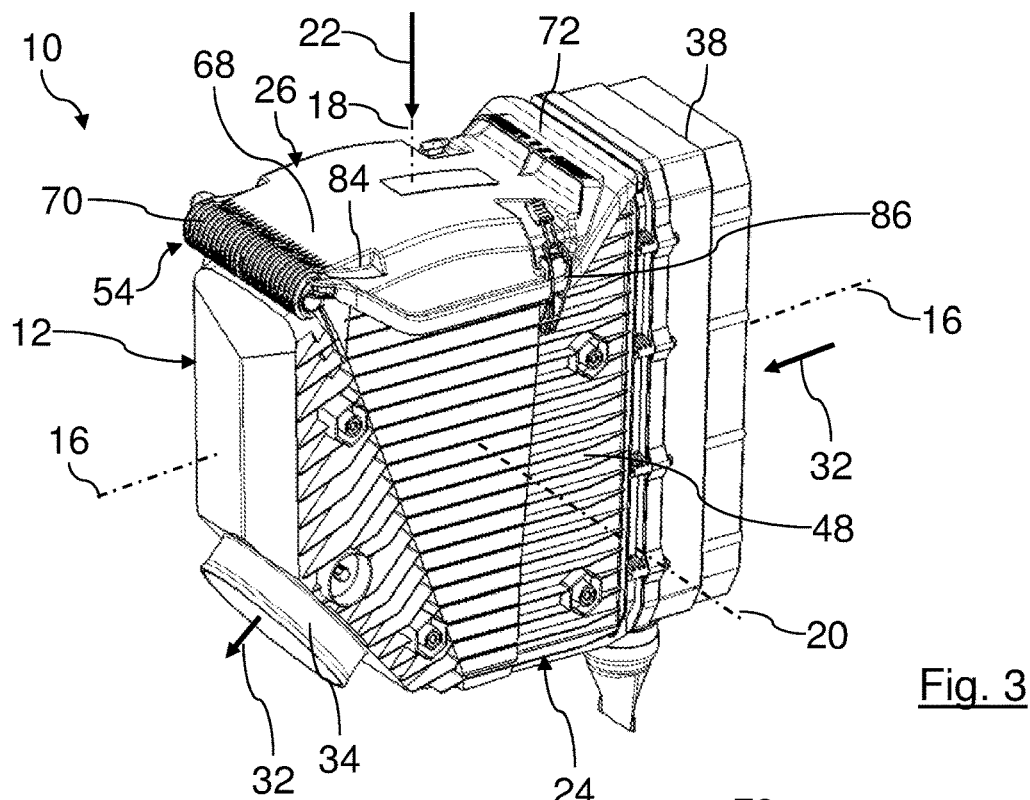
FIG. 3 is an isometric illustration of the air filter of FIGS. 1 and 2.
Figure 4:
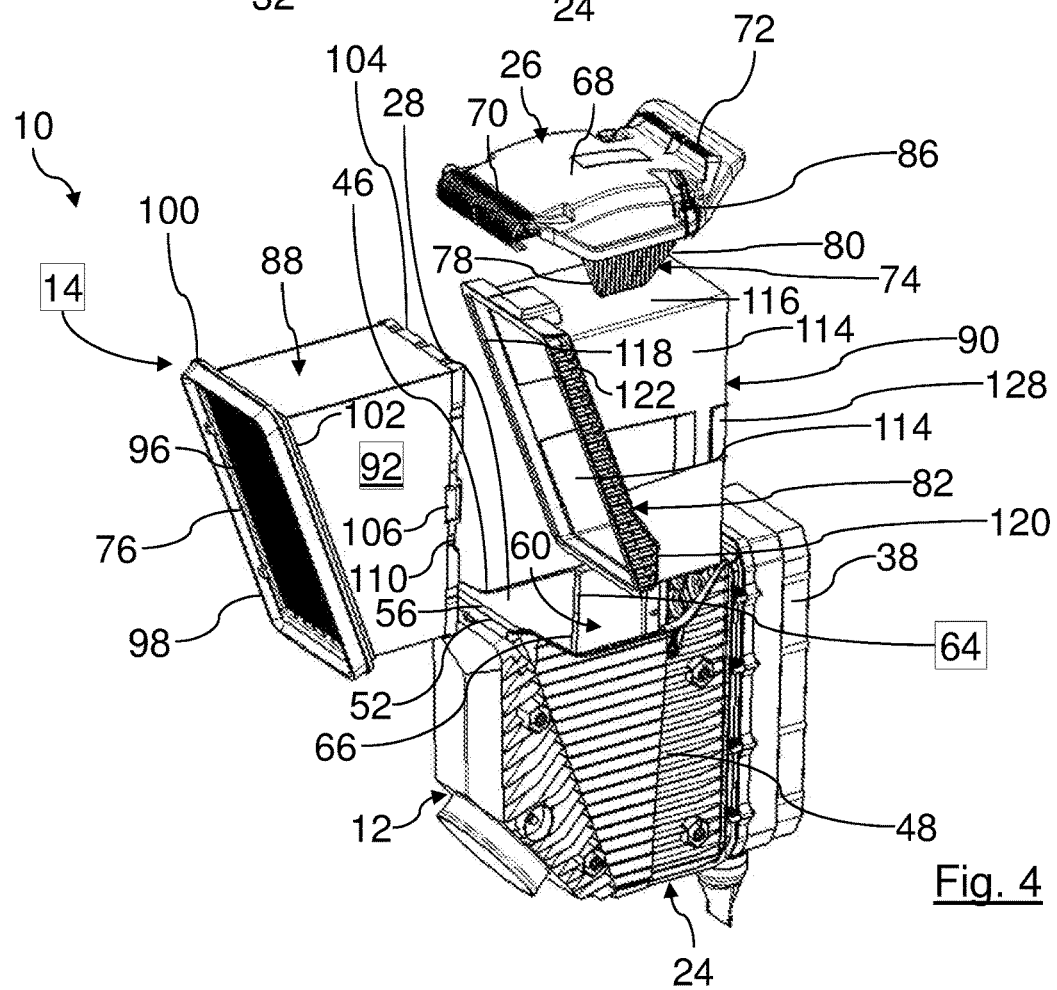
FIG. 4 is an isometric exploded illustration of the air filter of the FIGS. 1 to 3.
Figure 5:
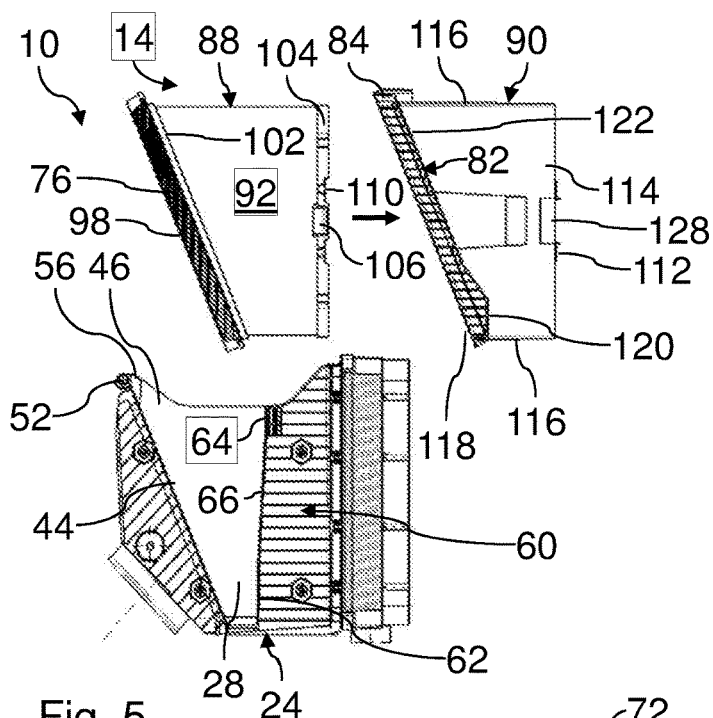
FIG. 5 shows the air filter of FIGS. 1 to 4 in a first installation phase of the filter element.

The housing cover 26 is secured in its closed position, as illustrated in FIG. 3, with two clamping fasteners 86 on axially oppositely positioned sides relative to the transverse axis 22 at the housing body 24. In regard to their leverage action, the clamping fasteners 86 are located beneficially in the region of the actuating section 72 on the side which is facing away from the pivot connection 54.

The filter element 14 comprises a filter bellows 88 which is inserted into an element frame 90. In the following, the filter element 14 will be explained in more detail with the aid of FIGS. 10 to 12.

The filter bellows 88 comprises a zigzag-shaped folded filter medium 92. The filter bellows 88 is rectangular viewed in the direction of the main axis 16. Viewed in the direction of the transverse axis 20, the filter bellows 88 has approximately the shape of a right angle trapezoid. An inflow side 94 of the filter bellows 88 extends parallel to the flow center plane, thus perpendicular to the main axis 16. An outflow side 96 extends parallel to the transverse axis 20 and at a slant to the flow center plane, thus at a slant to the inflow side 94.

The filter bellows 88 tapers, viewed in installation direction 22, toward its forward transverse side. The fold edges of the filter medium 92 at the inflow side 94 and the outflow side 96 extend each parallel to the transverse axis 20. The fold edges define the inflow surface at the inflow side 94 and the outflow surface at the outflow side 96, respectively. The heights of the folds of the folded filter medium 92 in the direction of the main axis 16 decrease from the transverse side of the filter bellows 88 that is rearward relative to the installation direction 22 toward its forward transverse side. The filter bellows 18 has thus variable fold heights.

The outflow side 96 is surrounded by the seal 76. The seal 76 is made of polyurethane. It is elastic. The seal 76 is foamed onto the end face of the filter medium 92. The seal 76 projects past the filter medium 92 relative to the main axis 16 radially in outward direction and in axial direction. An outflow-associated end face sealing lip of the seal 76 forms a sealing surface 98 which is continuous circumferentially relative to the main axis 16. The sealing surface 98 in the installed state is resting against the housing-associated sealing surface 44.

At the rear side of the seal 76, which is facing away from the sealing surface 98 relative to the main axis 16, a reinforcement frame 100 of plastic material is embedded in the sealing bead of the seal 76. The reinforcement frame 100 extends parallel to the sealing plane 44 and parallel to the sealing surface 98. The reinforcement frame 100 is continuous circumferentially relative to the main axis 16. A sealing rear side 102 of the seal 76, which is facing away axially from the sealing surface 98 relative to the main axis 16, extends in a plane parallel to the plane of the sealing surface 98. With installed filter element 14, the respective planes of the sealing surface 98 and of the sealing rear side 102 extend parallel to the sealing plane 45 of the housing-associated sealing surface 44.

Moreover, an edge protection 104 is fastened at the inflow side 94 of the filter bellows 88. The edge protection 104 is comprised of polyurethane and is foamed onto the filter medium 92. The edge protection 104 extends continuously circumferentially relative to the main axis 16 along the inflow-associated rim of the filter bellows 88. The edge protection 104 projects past the filter medium 92 relative to the main axis 16 in axial direction.

The edge protection 104 comprises, approximately centrally at the longitudinal sides of the filter bellows 88, a respective locking nose 106. The locking noses 106 are part of a locking device 108 between the filter bellows 88 and the element frame 90. The locking noses 106 are each monolithically formed of the material of the edge protection 104. The locking noses 106 are thus combined with the edge protection 104. The locking noses 106 extend at opposite longitudinal sides of the filter bellows 88 in the direction of the transverse axis 20 outwardly and parallel to the installation axis 18, respectively.

Viewed in the direction of the installation axis 18, the edge protection 104 has two cutouts 110, respectively, in front of and behind each locking nose 106. The cutouts 110 serve for inserting a frame stay 112 of the element frame 90, respectively.

The element frame 90 is made of plastic material. The element frame 90 comprises a rectangular circumferential wall which extends relative to the main axis 16 circumferentially as one piece and continuously and which is comprised of longitudinal walls 114 and transverse walls 116 that are parallel to each other, respectively. At the inflow side and the outflow side, the element frame 90 is open. The outer shape of the element frame 90 corresponds otherwise approximately to the outer shape of the filter bellows 88.

At the outflow side, the element frame 90 comprises the seal support device 82. The seal support device 82 is arranged at the outflow-associated rim of the element frame 90. The seal support device 82 extends at the exterior side of the filter element 14 circumferentially continuously relative to the main axis 16. The seal support device 82 is connected as one piece together with the longitudinal walls 114 and the transverse walls 116.

One leg each of the seal support device 82 extends along the exterior sides of the longitudinal walls 114. The legs of the seal support device 82 in greater shape are identical and relative to the longitudinal center axis mirror-symmetrically arranged. In the following, one of the legs of the seal support devices 82 will be explained in more detail in an exemplary fashion.

At its end face which is facing the outflow side, the leg of the seal support device 82 forms a corresponding section of a seal-facing element-associated support surface 118. The entire seal-associated element-associated support surface 118 extends relative to the main axis 16 circumferentially continuously in a plane. The plane of the seal-facing element-associated support surface 118 extends parallel to the transverse axis 20 and at a slant to the flow center plane. The slant angle of the plane of the seal-facing element-associated support surface 118 relative to the flow center plane corresponds to the slant angle of the seal rear side 102 of the filter bellows 88 relative to the flow center plane. Both slant angles correspond to the angle 47 of the housing-associated sealing plane 45 relative to the flow center plane.

Moreover, each leg of the seal support device 82, viewed in the installation direction 22, comprises a forward element-associated support surface 120 facing away from the seal and a rearward element-associated support surface 122 facing away from the seal. The rearward element-associated support surface 122 facing away from the seal is located adjacent to the rearward transverse wall 116. The forward element-associated support surface 120 facing away from the seal is located adjacent to the forward transverse wall 116.

The rearward element-associated support surface 122 facing away from the seal and the forward support surface 120 facing away from the seal are each facing the inflow side of the filter element 14. The rearward element-associated support surface 120 facing away from the seal extends parallel to the seal-facing element-associated support surface 118. The forward element-associated support surface 120 facing away from the seal extends at a slant angle relative to the seal-facing element-associated support surface 118 which corresponds to the angle 47 between the sealing plane 45 of the housing-associated sealing surface 44 and the flow center plane. At the forward side relative to the installation direction 22, the seal-facing element-associated support surface 118 and the respective section of the forward support surface 120 facing away from the seal, viewed in the direction of the transverse axis 20, form a wedge shape having a tip pointing in the installation direction 22.

The seal support device 82 forms in the region of the rearward transverse wall 116 two pressing locations 124 for the respective pressing sections 84 of the housing cover 26.

A grip 26 is provided in the region of the rearward transverse wall 116 of the element frame 90. By the grip 126, the filter element 14 can be gripped, carried, and pulled out of the filter housing 12.

In the region of the inflow side, each longitudinal wall 114 has a locking receptacle 128 of the locking connection 108. The locking receptacles 128 are located at the inner sides of the longitudinal walls. The locking receptacles 128 are approximately complementary to the locking noses 106 of the filter bellows 88.

Viewed in installation direction 22, two frame stays 112 extend parallel to the transverse axis 20 between the two longitudinal walls 114 in front of and behind the locking receptacles 128. The frame stays 112 are located at the inflow side 94 of the filter element 14.

The expansion of the filter element 14 in the region of the rearward transverse side is larger in the direction of the main axis 16 than the inner width 58 of the installation opening 46 of the filter housing 12.

For mounting, the filter bellows 88 with its inflow side 94 leading is inserted into the outflow side of the element frame 90. In the correct installation position, the bellows-associated locking noses 106 of the locking connection 108 lock with the corresponding frame-associated locking receptacles 128. The edge protection 104 projects through the inflow-associated opening of the element frame 90 and projects past it relative to the main axis 16 in axial direction. In this context, the locking stays 112 extend through the corresponding cutouts 110 of the edge protection 104. The seal-facing element-associated support surface 118 of the element frame 90 is resting areally against the seal rear side 102 of the seal 76.

By means of the locking connection 108, the filter bellows 88 is secured in the element frame 90. The filter element 14 can thus be hit with the edge protection 104 against a hard surface for beating the filter bellows 88. The filter bellows 88 must not be removed from the element frame 90 for this purpose.

The locking connection 108 can be separated in case the filter bellows 88, for example, for servicing purposes or for exchange from the element frame 90, is to be pulled out. The element frame 90 can then be reused with a new filter bellows 88.

Figure 6:
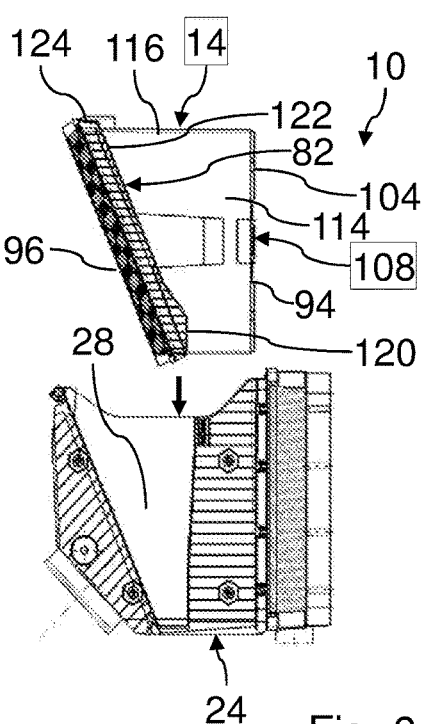
FIG. 6 shows the air filter of FIGS. 1 to 4 in a second installation phase of the filter element.

The assembly of the air filter 10 will be explained in the following with the aid of the FIGS. 5 to 9 in more detail. The assembled filter element 14, as shown in FIG. 6, is inserted with the forward transverse side leading in installation direction 22, axially relative to the installation axis 18, through the installation opening 46 into the element receptacle 28 of the housing body 24.

When inserting the filter element 14, the forward support surfaces 120 of the seal support device 82 which are facing away from the seal glide along the housing-associated guide surface 66 of the pressing devices 60 and are thus guided into their end position. The wedge-type arrangement of the seal support device 82 with the seal 76, on the one hand, and the wedge-shaped arrangement of the housing-associated seal surface 44 and the forward housing-associated pressing surface 62, on the other hand, have the effect that the seal 76 with increasing pressure during installation is pressed against the housing-associated sealing surface 44 in the forward region.

Figure 7:
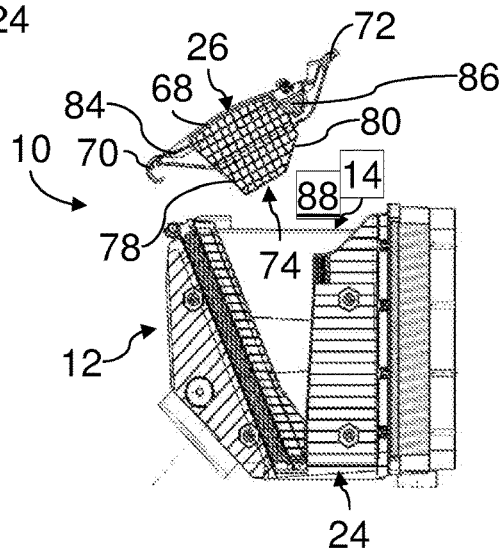
FIG. 7 shows the air filter of FIGS. 1 to 4 in a third installation phase of the filter element.
Figure 8:
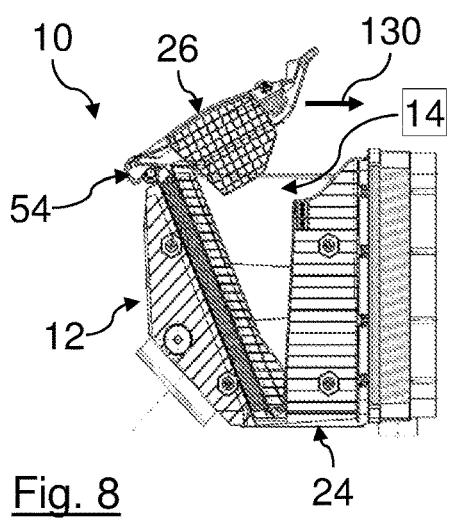
FIG. 8 shows the air filter of FIGS. 1 to 4 in a fourth installation phase of the filter element.

Subsequently, as shown in FIGS. 7 and 8, the sleeve section 70 of the housing cover 26 is placed with its open longitudinal side onto the bolt section 52 of the housing body 24. In this context, the housing cover 26 is held above the installation opening 46 such that the pressing blades 74 project partially through the installation opening 46.

The housing cover 26 is pushed in the direction of the main axis 16, indicated in FIG. 8 by arrow 130, toward the inflow side. In doing so, the sleeve section 70 and the bolt section 52 are joined to the pivot connection 54.

Figure 9:
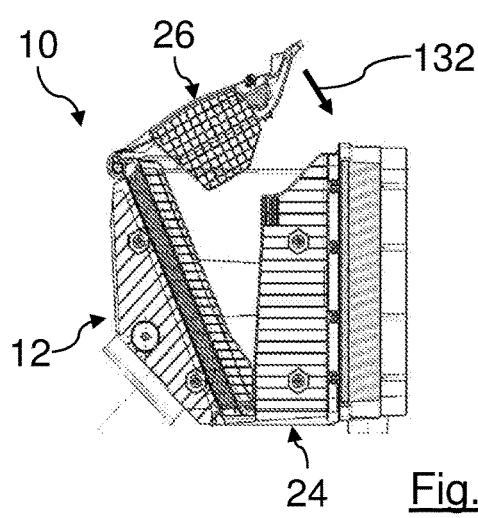
FIG. 9 shows the air filter of FIGS. 1 to 4 in a fifth installation phase of the filter element.
Figure 13:
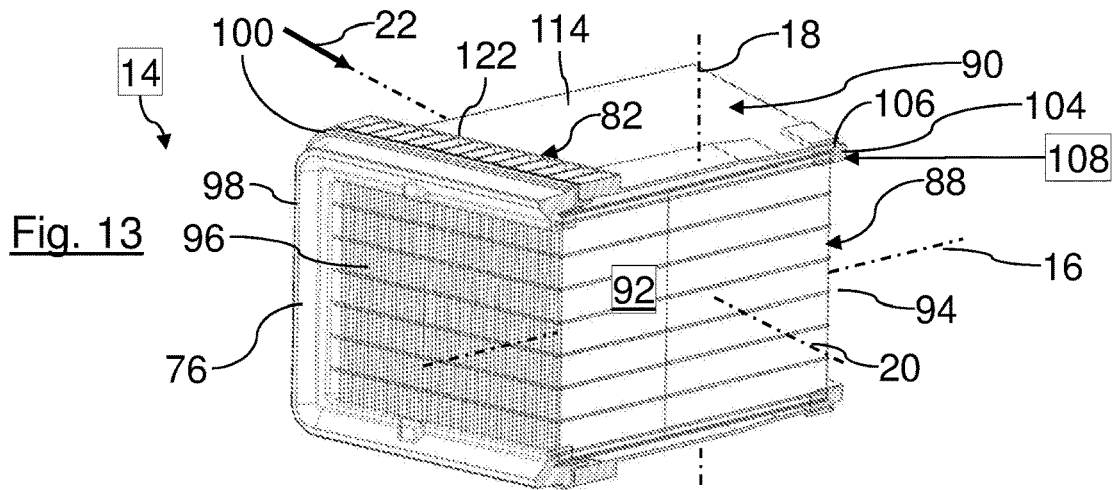
FIG. 13 is an isometric cross section of the filter element of the FIGS. 10 to 12.
Figure 14:
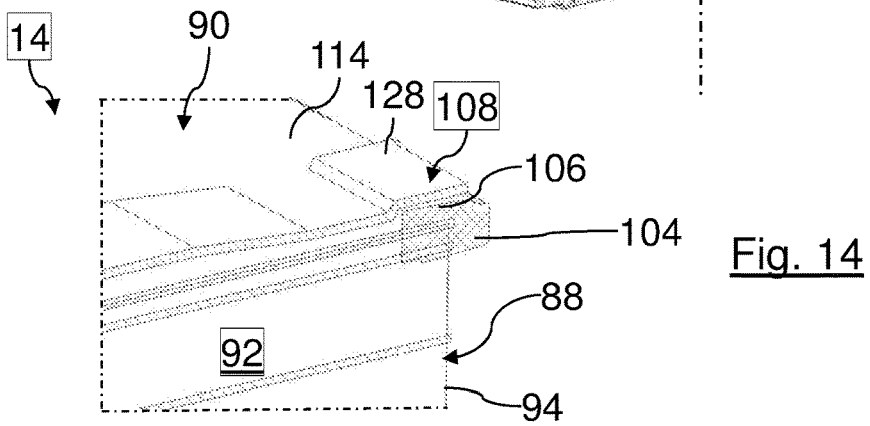
FIG. 14 is a detail view of the cross section of the filter element of the FIG. 13 in the region of the inflow side of the filter element.
Figure 15:
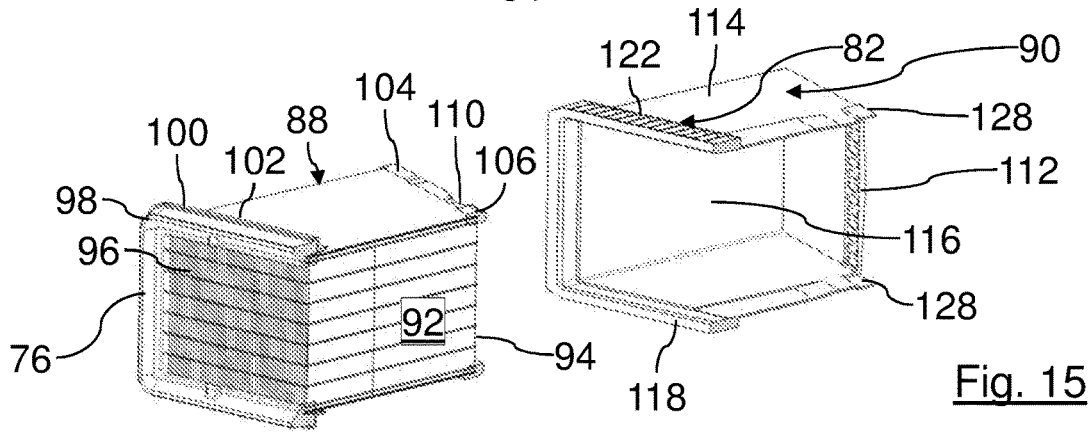
FIG. 15 is an isometric exploded illustration of the cross section illustration of the filter of FIG. 13.
Figure 16:
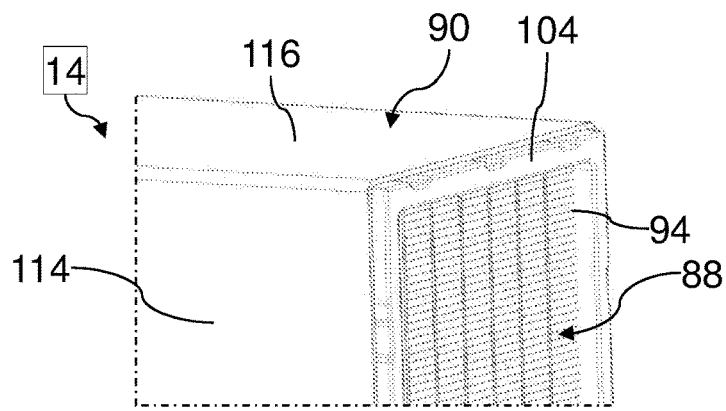
FIG. 16 is an isometric detail view of the inflow side of the filter element of FIGS. 10 to 12.
Figure 17:
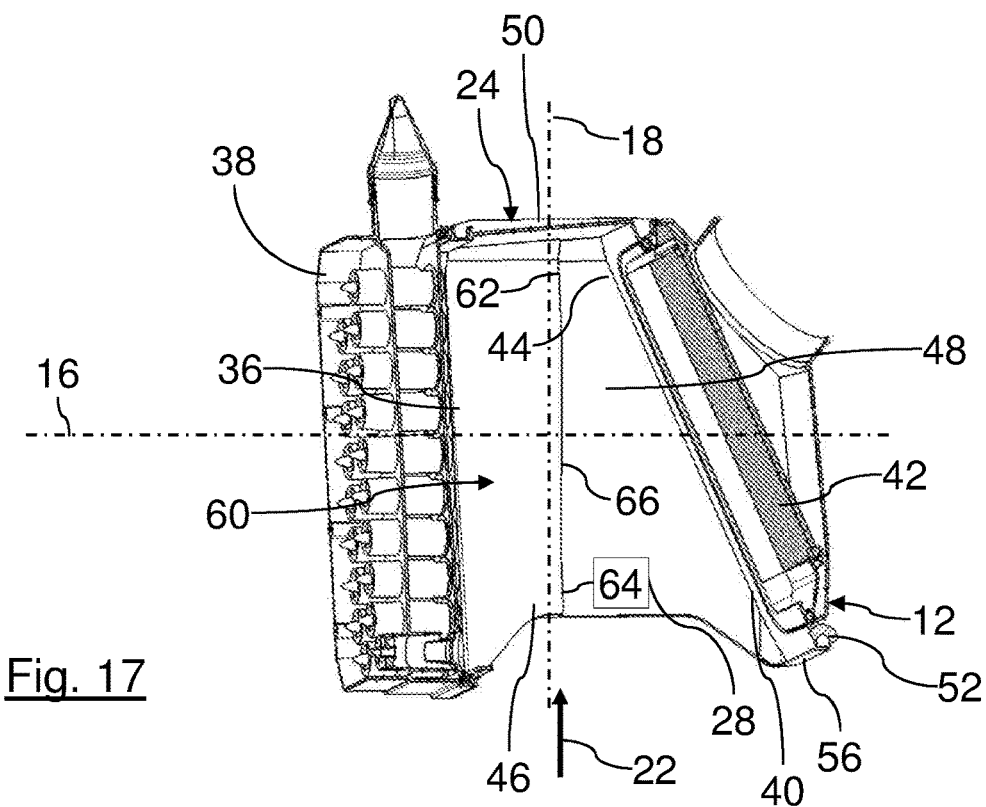
FIG. 17 is a filter housing of the air filter of the FIGS. 1 to 9 in an overhead installation.
Figure 18:
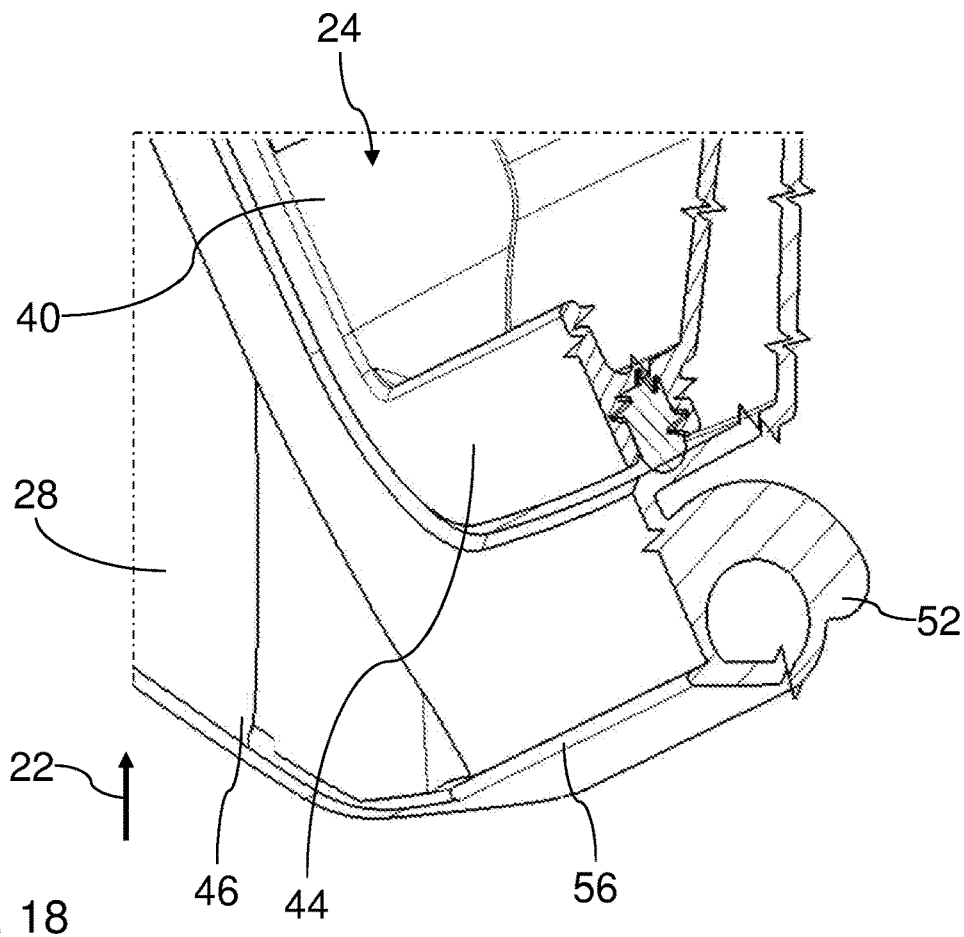
FIG. 18 shows a detail view of the filter housing of FIG. 17 in the region of a fall-out protection for the filter element.
Figure 19:
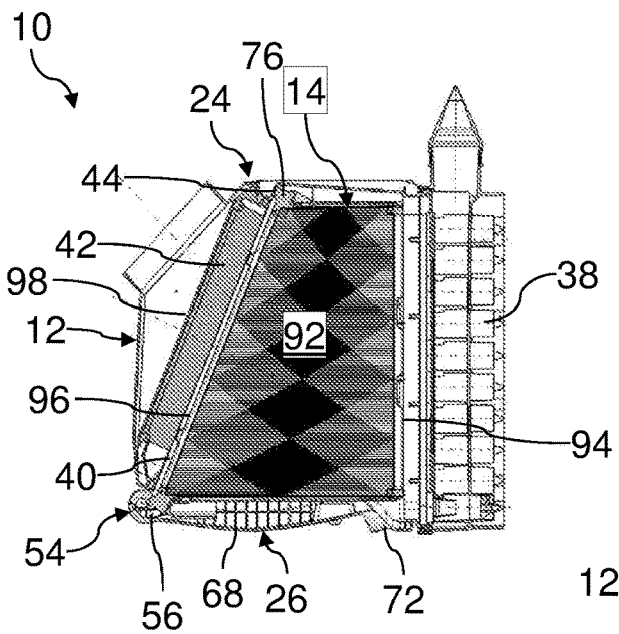
FIG. 19 shows the air filter of FIGS. 14 and 18 in overhead installation.
Figure 20:
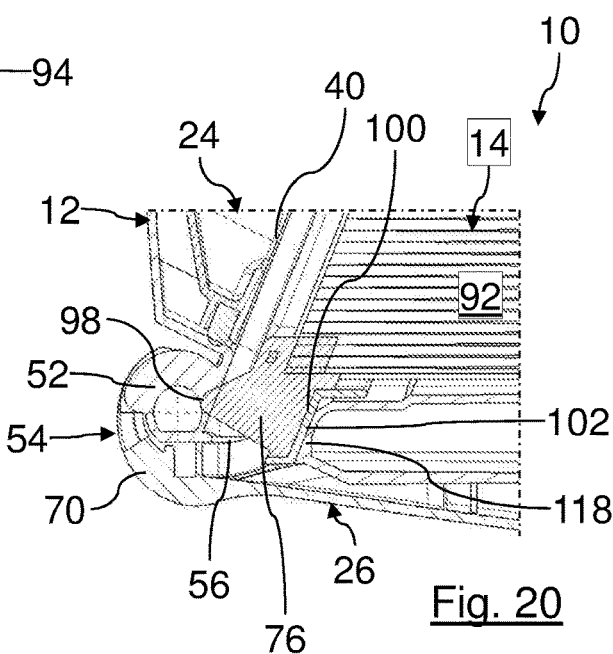
FIG. 20 shows a detail view of FIG. 19.
Figure 21:
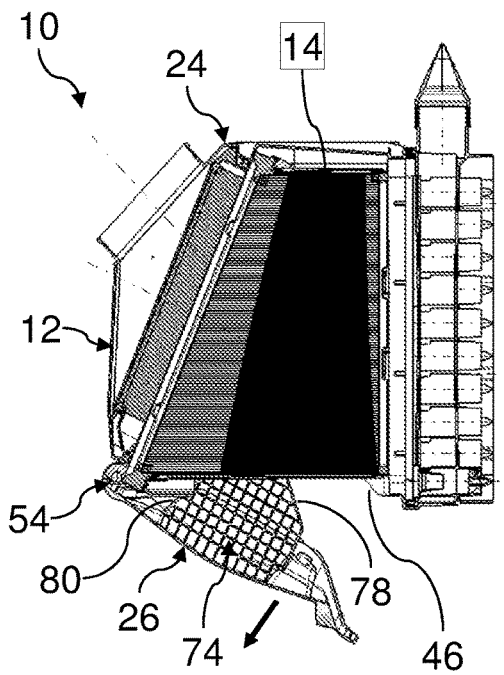
FIG. 21 shows a first demounting phase of the air filter of FIG. 19.
Figure 22:
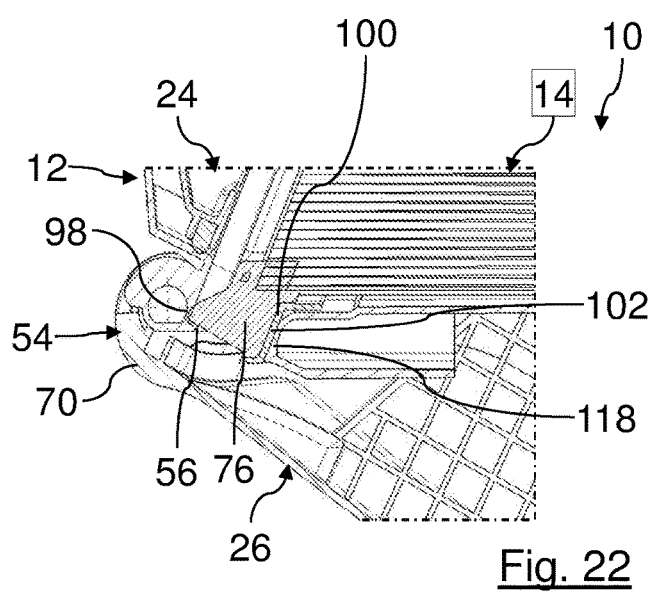
FIG. 22 shows a detail view of FIG. 21.

Subsequently, as shown in FIG. 9, the housing cover 26 is pivoted about the pivot axis of the pivot connection 54 toward the housing body 24, which is indicated in FIG. 9 by an arrow 132.

With pivoting of the housing cover 26, initially the forward tangential sections of the cover-associated pressing surfaces 80, facing away from the seal, of the respective pressing blades 74 are gliding along the corresponding rearward housing-associated pressing surfaces 64 of the housing-associated pressing devices 60. After overcoming the bends of the cover-associated pressing surfaces 80 facing away from the seal, the rearward sections, which are parallel to the installation axis 18, of the cover-associated pressing surfaces 80 that are facing away from the seal are respectively supported in the end position force-transmittingly on the rearward housing-associated pressing surfaces 64, as shown in FIG. 2.

The closed housing cover 26 is secured by means of the clamping fasteners 86 on the housing body 24. By clamping the clamping fasteners 86, the housing cover 26 is pressed farther against the housing body 24. The leverage action has the effect that the pressing blades 74 are more strongly forced into the space between the pressing devices 60 and the seal support devices 82.

Figure 2:
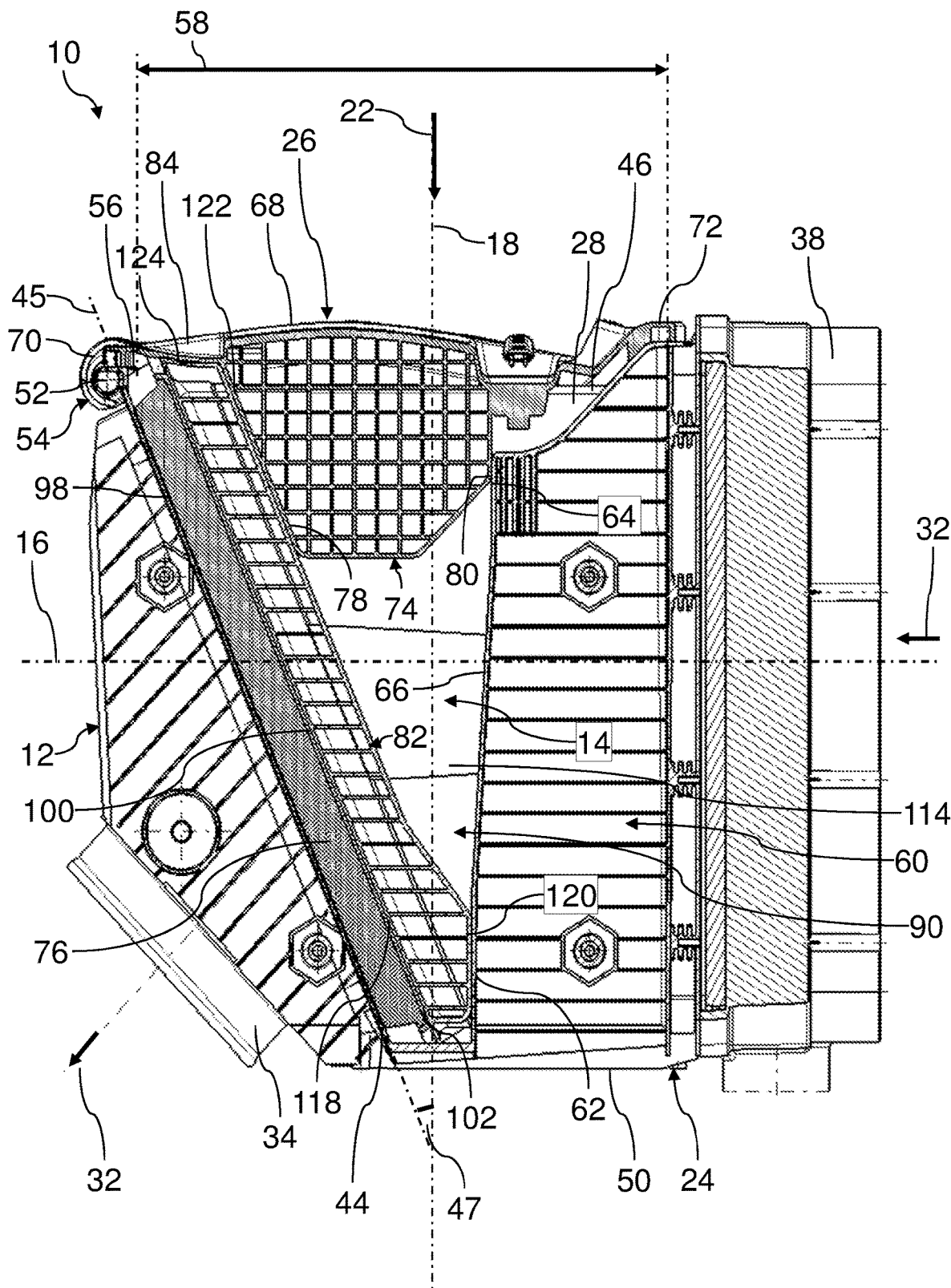
FIG. 2 shows a longitudinal view of the air filter of FIG. 1 wherein the forward longitudinal wall of the filter housing in the viewing direction is partially sectioned.

In the end position illustrated in FIG. 2, the filter element 14 is clamped in the housing body 24 by means of the seal support device 82 with the aid of the pressing blades 74 and the pressing devices 60. The seal-facing cover-associated pressing surfaces 78 are positioned flat against the respective rearward support surface 122 facing away from the seal. The forward housing-associated pressing surfaces 62 lies flat against the corresponding forward support surfaces 120, facing away from the seal, of the seal support device 82. At the side of the air inlet opening 36 as well as at the side of the transverse wall 50, the seal 76 is uniformly pressed against the housing-associated sealing surface 44 by means of the pressing blades 74, the pressing devices 60, and the seal support device 82. The seal 76 is facing the clean air side of the filter element 14 and seals it relative to the raw air side. The respective wedge-type configuration of the pressing blades 74, of the forward region of the seal support device 82 in the installation direction 22, and of the housing-associated sealing surface 44 in relation to the pressing devices 60 enables in this context use of corresponding installation forces in the installation direction 22 for increasing sealing forces perpendicular to the sealing plane 45.

In the FIGS. 17 to 25, the air filter 10 is shown in an overhead installation position in which the installation opening 46 is facing spatially downwardly.

For demounting the filter element 14 in the overhead installation position, first the clamping fasteners 86 are released. Then the housing cover 26 is pivoted in downward direction about the axis of the pivot connection 54, as illustrated in the FIGS. 21 and 22. Subsequently, the housing cover 26 is pushed away from the inlet side of the filter housing 12 in the direction of the main axis 16 so that the sleeve section 70 of the pivot connection 70 is separated from the bolt section 52. The housing cover 26 is completely removed.

Figure 23:
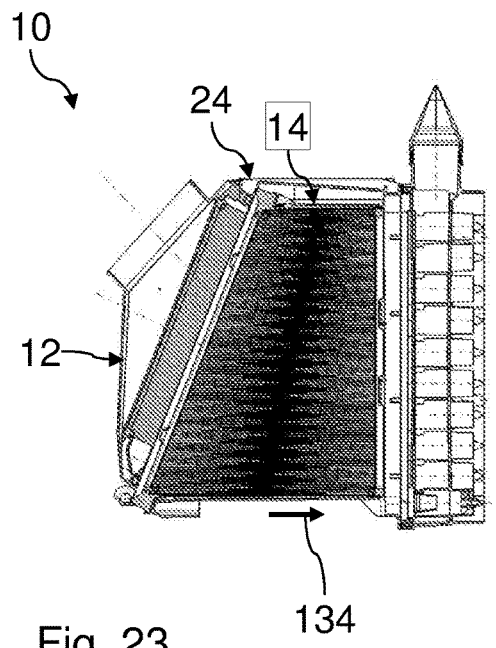
FIG. 23 shows a second demounting phase of the air filter of FIG. 19.
Figure 24:
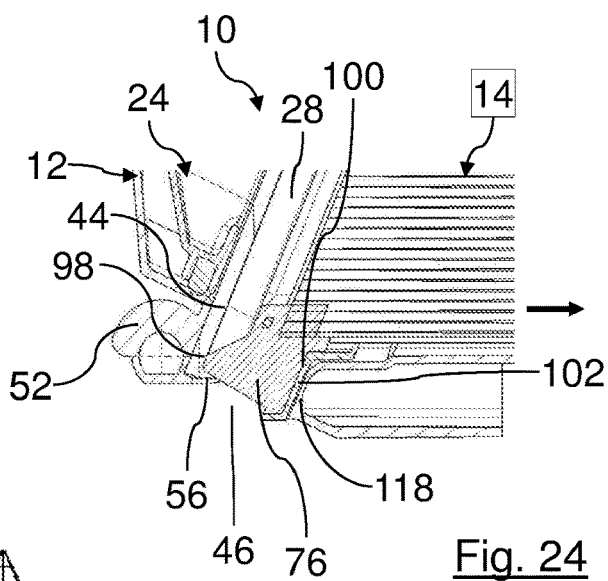
FIG. 24 shows a detail view of FIG. 23.

The fall-out protection device 56 of the housing body 24 blocks, as shown in the FIGS. 23 and 24, the sealing lip of the seal 76. The fall-out protection device 56 prevents that the filter element 14 can fall out spatially in downward direction in an uncontrolled fashion out of the housing body 24.

Figure 25:
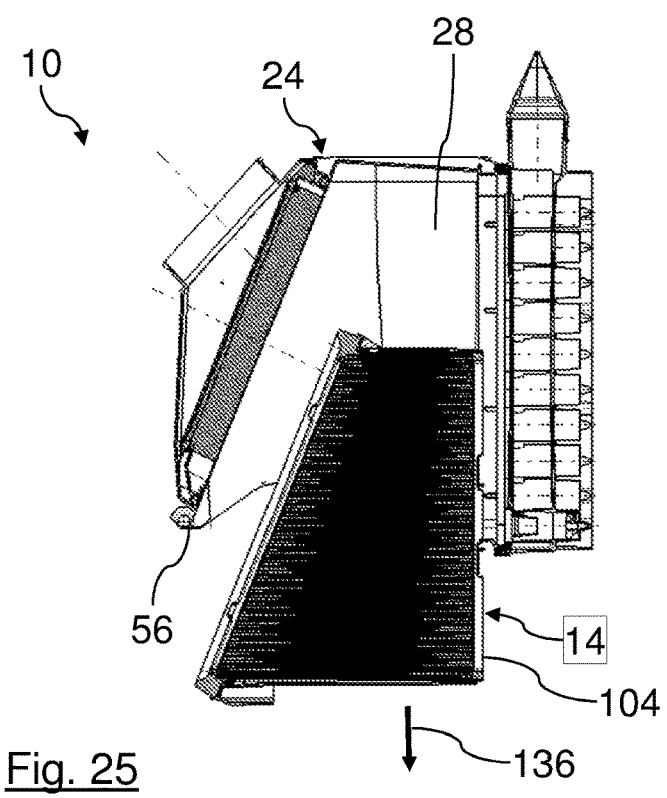
FIG. 25 shows a third demounting phase of the air filter of FIG. 19.

In order to be able to remove the filter element 14 from the housing body 24, it must be pushed somewhat to the inflow side of the air filter 10, as indicated in FIG. 23 by an arrow 134, so that the transverse section of the seal 76 facing the installation opening 46 can be moved past the fall-out protection device 56 with a slight elastic deformation. The filter element 14 can subsequently, as illustrated in FIG. 25, be removed spatially in downward direction, indicated by an arrow 136, from the housing body 24.

Figure 26:
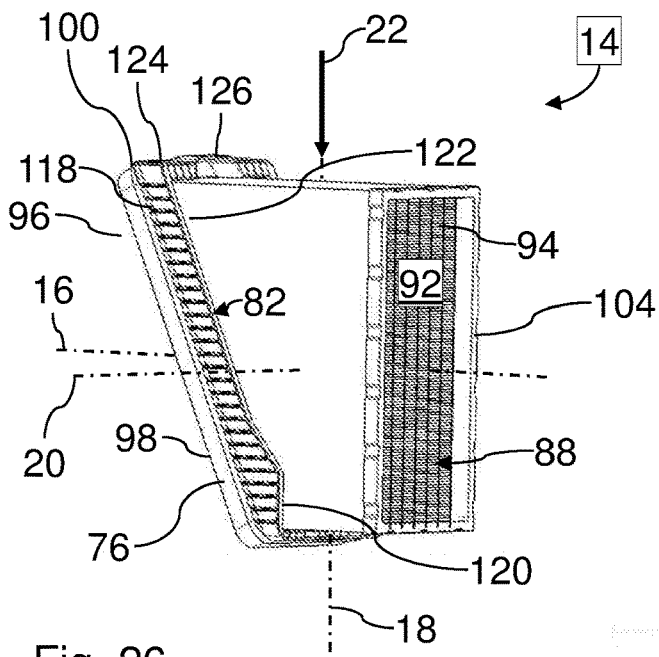
FIG. 26 is an isometric view of a filter element according to a second embodiment looking at a slant onto the inflow side.
Figure 27:
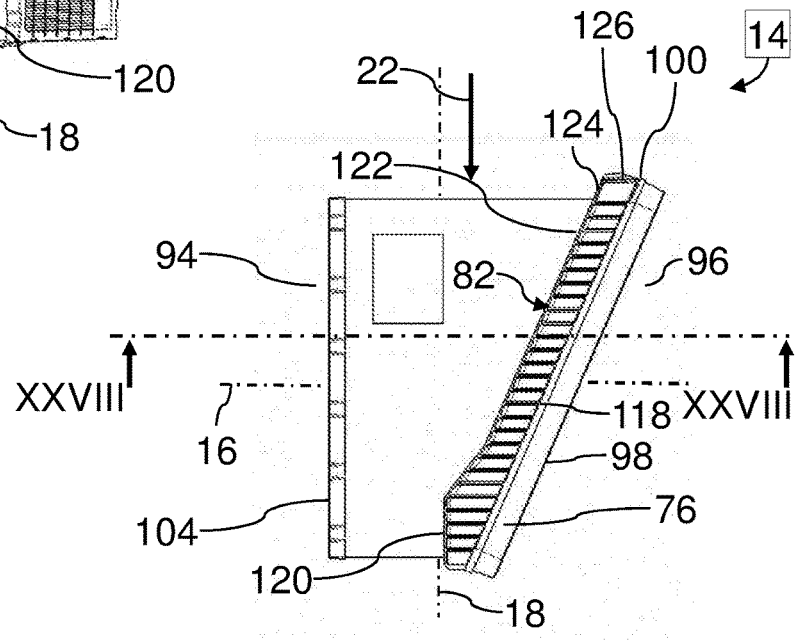
FIG. 27 is a side view of the filter element of FIG. 26.
Figure 28:
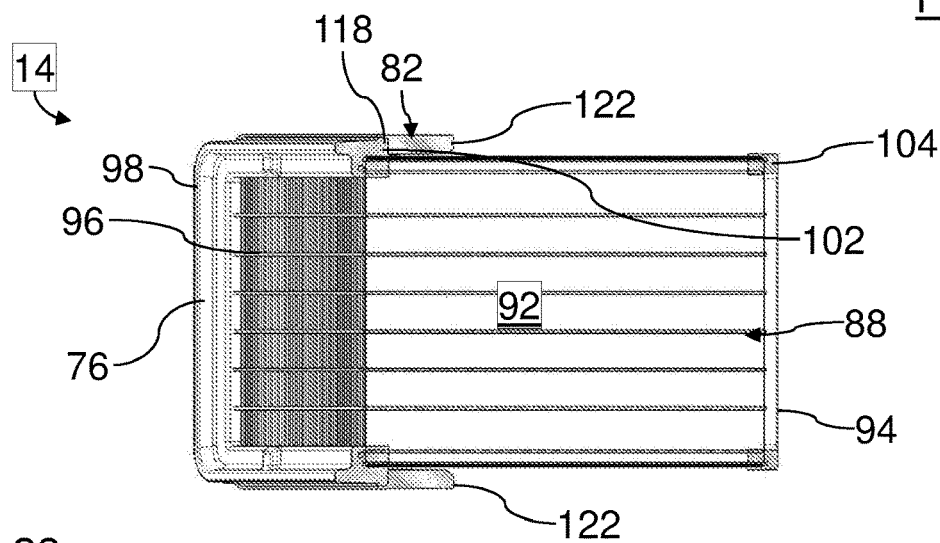
FIG. 28 is an isometric cross section illustration of the filter element of FIGS. 26 and 27 along the section line XXVIII-XXVIII of FIG. 27.

In FIGS. 26 to 28, a filter element 14 according to a second embodiment is illustrated. Those elements that are similar to those of the first embodiment of the FIGS. 1 through 25 are identified with the same reference characters. The second embodiment differs from the first embodiment in that in the second embodiment of FIGS. 26 to 28 the seal support device 28 is directly attached to the filter bellows 88. In the second embodiment, no exchangeable element frame is provided. The filter element 14 is pre-manufactured and exchanged together with the filter bellows 88 and the seal support device 82.

What is claimed is:

1. A filter element of a filter for a fluid, the filter element configured to be installed in a filter housing in an installation direction extending parallel or coaxial to an installation axis; the filter element comprising:
   an element axis that is perpendicular or transverse to the installation axis;
   a radial outer circumferential side radially arranged relative to the element axis;
   at least one filter bellows comprising at least one filter medium, wherein the at least one filter bellows comprises a first flow face and a second flow face for fluid, wherein one of the flow faces is an inflow face and a remaining one of the flow faces is an outflow face,
   wherein the first and second flow faces are arranged axially opposite each other at axially oppositely positioned sides of the at least one filter bellows relative to the element axis of the filter element, the element axis extending through the first and second flow faces,
   wherein radial, as used herein, is a direction transverse to the element axis, and axial, as used herein, is a direction parallel to the element axis;
   wherein the radial outer circumferential side of the filter element includes:
      a first lateral wall on a first radially outer exterior side of the filter element and extending from the first flow face to the second flow face;
      a second lateral wall on an opposite second radially outer exterior side of the filter element and extending axially from the first flow face to the second flow face;
      wherein the second flow face is slanted and a non-zero angle relative to both the second lateral wall and the first flow face such that the first lateral wall is axially longer than the second lateral wall;
   at least one seal arranged, relative to the element axis, circumferentially at least partially continuously at least in sections at the radial outer circumferential side of the filter element;
   at least one seal support device arranged adjacent to the second flow face and projecting radially outwardly from the radial outer circumferential side of the filter element;
   wherein the at least one seal support device further comprises:
      a first leg arranged on a third radially outer exterior side of the filter element and extending in a radial direction from the first lateral wall and the second lateral wall;
      a second leg arranged on a fourth radially outer exterior side of the filter element an extending in a radial direction from the first lateral wall and the second lateral wall;
      wherein an axial width of the first leg and the second leg is defined as an axial distance, taken in a direction parallel to the element axis, measured from a first axial side of the first and second legs to an opposite second axial side of the first and second legs;
      wherein the first leg and second legs have a length and an axial width that varies by position along the length;
   wherein the first leg and the second leg include:
      at least one seal-facing support surface arranged on the first axial side of the first and the second legs, the at least one seal arranged on the at least one seal-facing support surface,
      at least one second support surface facing away from the at least one seal and disposed on the opposite second axial side of the first and the second legs;
         wherein the second support surface is arranged between and spaced axially apart from the first and second flow faces,
         wherein the second support surface includes:
            a rearward support surface formed as a first portion of a length of the second support surface, the rearward support surface forming a first pressing surface configured to transmit axial forces from the filter housing to the at least one seal to seal against a corresponding sealing surface in the filter housing, the rearward support surface arranged adjacent to the first lateral wall and extending approximately parallel to the at least one seal-facing support surface;
            a forward support surface formed as a different second portion of the length of the second support surface, the forward support surface forming a second pressing surface configured to transmit axial forces from the filter housing to the at least one seal to seal against the corresponding sealing surface in the filter housing, the forward support surface extends along the second portion of the length of the second support surface at a slant at an angle of between 10 degrees and 30 degrees relative to the at least one seal-facing support surface on the first axial side of the first and the second legs, such that the axial width of the first leg and second leg varies by position along the second portion of the length of the second support surface.

2. The filter element according to claim 1 wherein the at least one support surface facing away from the at least one seal extends, at least in sections thereof, parallel or at a slant relative to at least one of the first and second flow faces of the at least one filter bellows.

3. The filter element according to claim 1, wherein the at least one support surface facing away from the at least one seal extends, at least in sections thereof, parallel or at a slant relative to the installation axis.

4. The filter element according to claim 1, wherein the at least one support surface facing away from the at least one seal extends, at least in sections thereof, parallel or at a slant relative to at least one of the first and second flow faces of the at least one filter bellows and extends, at least in sections thereof, parallel or at a slant relative to the installation axis.

5. The filter element according to claim 1, wherein the at least one forward support surface and the at least one rearward support surface are positioned relative to each other at a slant at an angle of between 10° and 30°.

6. The filter element according to claim 1, wherein the at least one rearward support surface extends parallel to the at least one seal-facing support surface of the at least one seal support device, and
wherein the at least one forward support surface and the at least one rearward support surface are positioned relative to each other at a slant at an angle of between 10° and 30°.

7. The filter element according to claim 1, wherein the at least one seal support device is a frame extending, relative to the element axis, at least partially circumferentially about the filter element.

8. The filter element according to claim 7, wherein the frame is a filter element frame or a support frame of the filter element.

9. The filter element according to claim 1, wherein the at least one seal support device is connected to the at least one filter bellows so as be separable from the at least one filter bellows.

10. The filter element according to claim 1, wherein
the at least one seal support device is connected to the at least one filter bellows so as be separable from the at least one filter bellows only with destruction thereof.

11. A filter for a fluid, the filter comprising:
the filter element according to claim 1;
at least one filter housing comprising
a housing body,
wherein the housing body comprising
an element receptacle and
at least one openable installation opening configured to close off the element receptacle,
wherein the housing body further comprises
at least one inlet opening for fluid to be cleaned and
at least one outlet opening for cleaned fluid;
wherein the filter element is inserted through the at least one installation opening in the installation direction extending parallel or coaxially to the installation axis of the filter housing,
wherein the filter element inserted in the element receptacle separates the at least one inlet opening from the at least one outlet opening;
wherein the at least one openable installation opening is arranged in a transverse side of the housing body,
wherein the transverse side is lateral relative to a housing axis of the filter housing;
wherein the at least one filter housing comprises
at least one sealing surface surrounding the housing axis at least partially circumferentially;
wherein the at least one sealing surface surrounding the housing axis at least partially circumferentially is configured to contact the at least one seal of the filter element;
wherein the at least one filter housing comprises
at least one pressing device configured to act on the at least one seal support device of the filter element.

* * * * *